United States Patent
Saito

(10) Patent No.: US 12,055,839 B2
(45) Date of Patent: Aug. 6, 2024

(54) CAMERA ACTUATOR, CAMERA MODULE, AND CAMERA MOUNT DEVICE

(71) Applicant: Masahiro Saito, Tokyo (JP)

(72) Inventor: Masahiro Saito, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 627 days.

(21) Appl. No.: 17/289,325

(22) PCT Filed: Oct. 25, 2019

(86) PCT No.: PCT/JP2019/041853
§ 371 (c)(1),
(2) Date: Apr. 28, 2021

(87) PCT Pub. No.: WO2020/090639
PCT Pub. Date: May 7, 2020

(65) Prior Publication Data
US 2022/0019127 A1 Jan. 20, 2022

(30) Foreign Application Priority Data
Nov. 2, 2018 (JP) .................................. 2018-207502

(51) Int. Cl.
*G03B 13/36* (2021.01)
*G02B 7/09* (2021.01)

(52) U.S. Cl.
CPC ............... *G03B 13/36* (2013.01); *G02B 7/09* (2013.01)

(58) Field of Classification Search
CPC ...... G02B 27/646; G02B 6/3514; G02B 7/08; G02B 7/09; G02B 7/182; G02B 15/173;
(Continued)

(56) References Cited

U.S. PATENT DOCUMENTS

2014/0177056 A1 6/2014 Hayashi
2018/0024329 A1 1/2018 Goldenberg

FOREIGN PATENT DOCUMENTS

JP 2015092285 A 5/2015
JP 2016090778 A * 5/2016
(Continued)

OTHER PUBLICATIONS

International Search Report from International Application No. PCT/JP2019/041853 mailed Jan. 21, 2020.

*Primary Examiner* — Stephone B Allen
*Assistant Examiner* — Tamara Y. Washington
(74) *Attorney, Agent, or Firm* — Shih IP Law Group, PLLC.

(57) ABSTRACT

This camera actuator is provided with a stationary-side member, a movable-side member which is provided to the stationary-side member in a displaceable manner and which holds a lens section, and a drive section which displaces the movable-side member in a plane including a first direction and a second direction which is perpendicular to the first direction. The movable-side member has a magnet affixation section for affixing a magnet section thereto such that the magnet section faces the stationary-side member, the magnet section being used for detecting the position of the movable-side member in either the first direction or the second direction. The surface of the magnet affixation section, to which the magnet section is mounted, is formed from metal.

16 Claims, 25 Drawing Sheets

(58) Field of Classification Search
CPC ...... G02B 15/14; G02B 15/177; G02B 15/22;
G02B 15/16; G02B 13/18; G02B 13/009;
G02B 27/64; G02B 13/02; G02B 7/04;
G02B 13/0015; G02B 15/15; G02B
13/0045; G02B 15/17; G02B 15/20;
G02B 27/0025; G02B 9/62; G02B 13/04;
G02B 7/023; G02B 9/64; G02B 13/001;
G02B 13/0065; G02B 15/10; G02B
15/163; G02B 15/167; G02B 23/02;
G02B 7/02; G02B 7/022; G02B 7/102;
G02B 7/14; G02B 9/04; G02B 9/34;
G02B 9/60; G02B 13/002; G02B 13/004;
G02B 13/06; G02B 13/16; G02B 15/12;
G02B 15/161; G02B 17/08; G02B
17/0804; G02B 17/0808; G02B 17/0896;
G02B 21/26; G02B 23/08; G02B 26/004;
G02B 26/0808; G02B 26/0816; G02B
27/0911; G02B 27/644; G02B 3/14;
G02B 7/021; G02B 7/025; G02B 7/18;
G02B 7/24; G02B 7/28; G02B 9/00;
G02B 9/24; H04N 5/23287; H04N
5/2252; H04N 5/2254; H04N 5/2329;
H04N 5/2257; H04N 5/2253; H04N
5/23248; H04N 5/2328; H04N 5/225;
H04N 5/232; H04N 5/23209; H04N
5/23212; H04N 5/23245; H04N 5/23258;
H04N 5/23264; H04N 13/0203; H04N
13/0239; H04N 13/0296; H04N 5/222;
H04N 5/228; H04N 5/23229; H04N
5/23251; H04N 5/23254; H04N 5/23261;
H04N 5/23274; H04N 5/238; H04N
23/58; H04N 23/687; H04N 23/55; G03B
5/00; G03B 3/00; G03B 3/14; G03B
5/02; G03B 5/06; G03B 2205/0015;
G03B 3/10; G03B 2205/0069; G03B
2205/002; G03B 2205/0007; G03B 13/36;
G03B 17/02; G03B 17/04; G03B 17/14;
G03B 17/12; G03B 2205/0046; G03B
2205/0053; G03B 2205/0092; H02K
41/0356
See application file for complete search history.

(56) References Cited

FOREIGN PATENT DOCUMENTS

| JP | 2016090778 | A |   | 5/2016 |
|----|------------|---|---|--------|
| JP | 2017083575 | A | * | 5/2017 |
| JP | 2017083575 | A |   | 5/2017 |
| WO | 2016166730 | A1|   | 10/2016|

* cited by examiner

CAMERA ACTUATOR, CAMERA MODULE, AND CAMERA MOUNT DEVICE

TECHNICAL FIELD

The present invention relates to a camera actuator, a camera module, and a camera mount device.

BACKGROUND ART

Conventionally, a thin camera mount device on which a camera module is mounted, such as a smartphone and a digital camera, has been known. The camera module includes a lens part including one or more lenses, and an imaging element that captures a subject image formed by the lens part (see Patent Literature (hereinafter, referred to as "PTL") 1).

The camera module disclosed in PTL 1 has an autofocusing function (hereinafter, referred to as "AF (Auto Focus) function") of automatically performing focusing when a picture of a subject is taken, and a shake-correcting function (hereinafter, referred to as "OIS (Optical Image Stabilization) function") of correcting camera shake generated in a camera. Such a camera module includes an autofocus actuator for moving the lens part in a direction of an optical axis, and a shake correction actuator for moving the lens part within a plane orthogonal to the direction of the optical axis.

Further, in the case of the camera module disclosed in PTL 2, each of an autofocus actuator and a shake correction actuator is formed of a voice coil motor that includes: a magnet part fixed to a movable-side member holding a lens part; and a coil part provided in a fixed side-member in a state in which the coil part faces the magnet part.

CITATION LIST

Patent Literature

PTL 1
  Japanese Patent Application Laid-Open No. 2015-92285
PTL 2
  WO 2016/166730

SUMMARY OF INVENTION

Technical Problem

With respect to the camera module disclosed in PTL 2 as described above, a structure is desired in which the magnet part forming the voice coil motor hardly falls off from the movable-side member even in a case where an impact is applied to the camera module.

An object of the present invention is to provide a camera actuator, a camera module, and a camera mount device capable of preventing a magnet part forming a voice coil motor from falling off from a movable-side member.

Solution to Problem

One aspect of a camera actuator according to the present invention includes: a fixed-side member; a movable-side member provided so as to be displaceable with respect to the fixed-side member and holding a lens part; and a driving section that displaces the movable-side member within a plane including a first direction and a second direction orthogonal to the first direction. Further, the movable-side member includes a magnet fixing part that fixes a magnet part such that the magnet part faces the fixed-side member. The magnet part is used to detect a position of the movable-side member in one of the first direction and the second direction. Further, the magnet fixing part includes an attachment surface made of a metal. The magnet part is attached to the attachment surface.

One aspect of a camera module according to the present invention includes: the camera actuator described above; and an imaging element arranged at a stage subsequent to the lens part.

One aspect of a camera mount device according to the present invention includes: the camera module described above; and a control section that controls the camera module.

Advantageous Effects of Invention

According to the present invention, it is possible to prevent a magnet part forming a voice coil motor from falling off from a movable-side member.

DESCRIPTION OF EMBODIMENTS

Hereinafter, embodiments according to the present invention will be described in detail with reference to the accompanying drawings.

Embodiment 1

A camera module according to Embodiment 1 of the present invention will be described with reference to FIGS. 1 to 26B. Hereinafter, an outline of camera module 1 and then specific structures of prism module 2, lens module 3, and imaging element module 4 included in camera module 1 will be described. Note that, the camera actuator, the camera module, and the camera mount device according to the present invention may include all configurations to be described later or may not include some of the configurations.

<Camera Module>

Figure 27A:
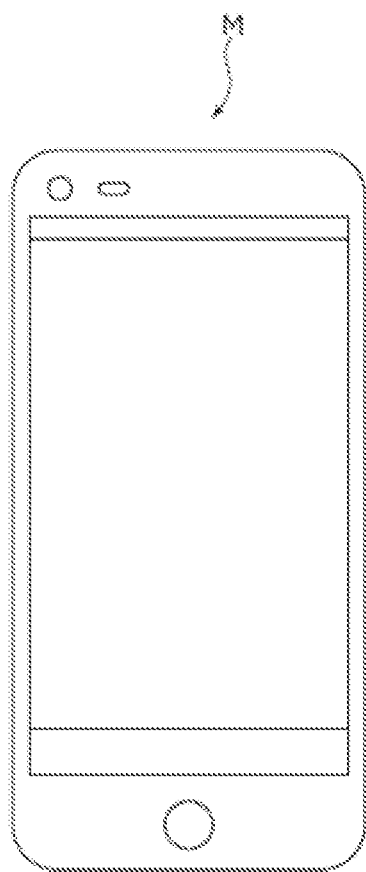
FIGS. 27A and 27B are a front view and a rear view illustrating an example of a camera mount device on which the camera module is mounted.
Figure 27B:
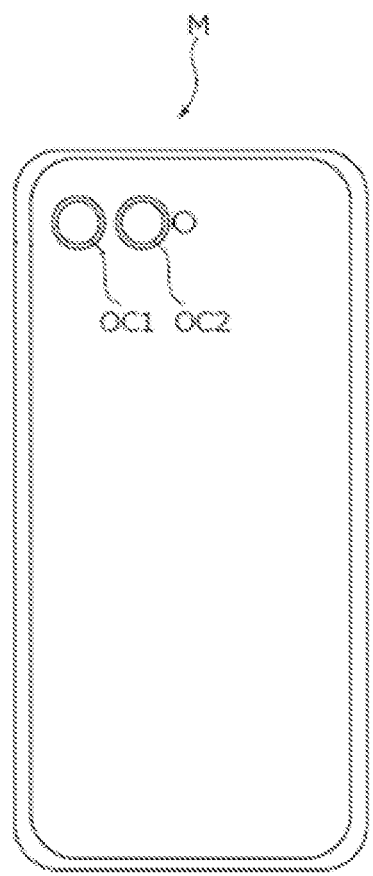

Camera module 1 is mounted on a thin camera mount device, for example, smartphone M (see FIGS. 27A and 27B), a mobile phone, a digital camera, a notebook computer, a tablet terminal, a portable game machine, an in-vehicle camera or the like.

Hereinafter, each component of camera module 1 of the present embodiment will be described based on a state in which each component is incorporated in camera module 1. Further, in the description of the structure of camera module 1 of the present embodiment, an orthogonal coordinate system (X, Y, Z) indicated in each drawing is used. The X direction corresponds to an example of the first direction. Further, the Y direction corresponds to an example of the second direction.

In a case where the camera mount device is used to take a picture in practice, camera module 1 is mounted such that the X direction is the left-right direction, the Y direction is the up-down direction, and the Z direction is the front-rear direction, for example. Light from a subject enters prism 23 of prism module 2 from the + side (plus side) in the Z direction as indicated by long dashed short dashed line α (also referred to as first optical axis) in FIG. 2. The light incident on prism 23 is bent at optical path bending surface 231 (see FIG. 8) of prism 23 as indicated by long dashed short dashed line β (also referred to as second optical axis) in FIGS. 2 and 10A and is guided to lens part 33 of lens module 3 arranged at a stage subsequent to (that is, on the + side in the X direction) prism 23. A subject image formed by lens part 33 (see FIG. 10A) is then captured by imaging element module 4 (see FIG. 1) arranged at a stage subsequent to lens module 3.

Camera module 1 described above performs shake correction (optical image stabilization (OIS)) using first shake correction apparatus 24 (see FIGS. 2 and 8) incorporated in prism module 2 and second shake correction apparatus 35 (see FIGS. 11 and 12) incorporated in lens module 3. Further, camera module 1 described above performs auto-focusing by displacing lens part 33 in the X direction using AF apparatus 34 (see FIGS. 11 and 12) incorporated in lens module 3.

Hereinafter, prism module 2, lens module 3, and imaging element module 4 included in camera module 1 of the present embodiment will be described with reference to FIGS. 1 to 26B.

<Prism Module>

Prism module 2 will be described with reference to FIGS. 1 to 8. Prism module 2 includes first cover 21, first base 22, prism 23, and first shake correction apparatus 24.

<First Cover>

Figure 1:
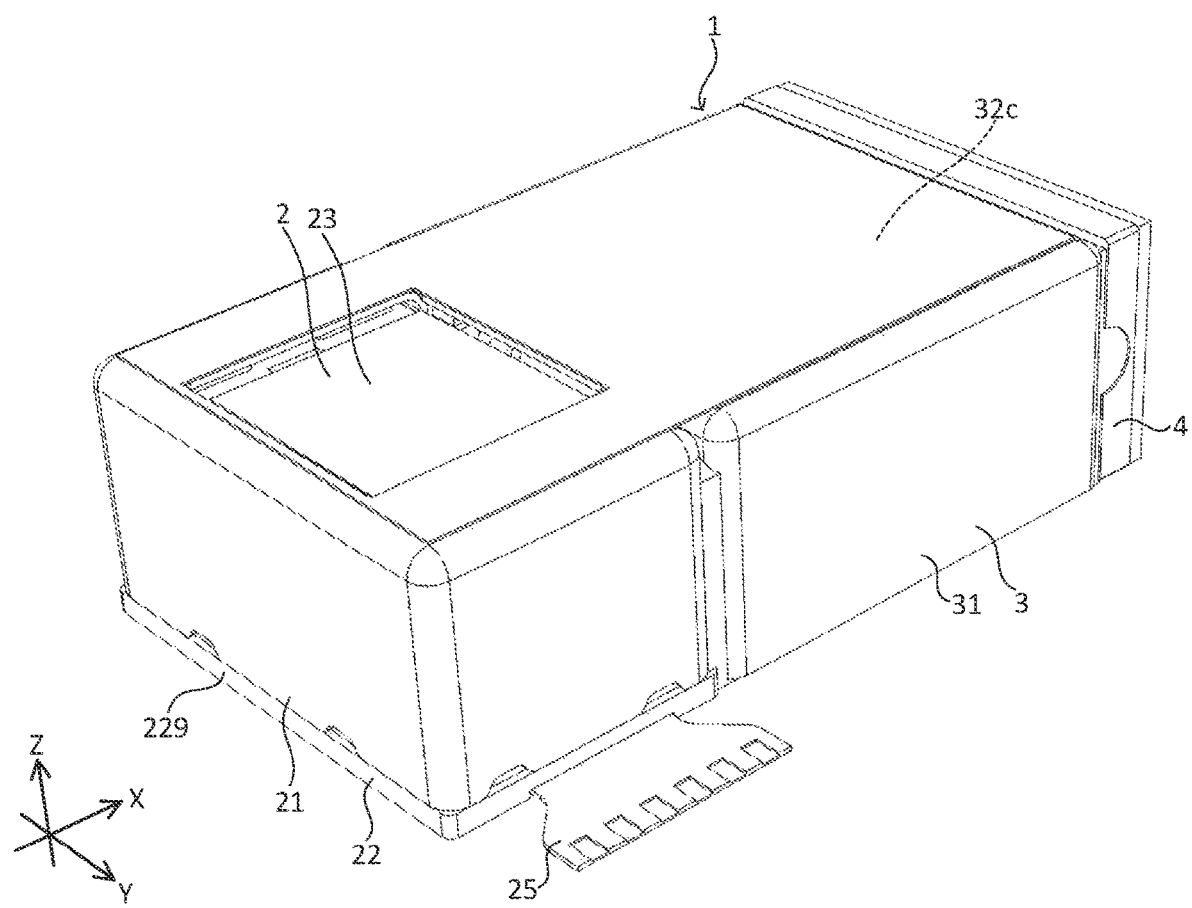
FIG. 1 is a perspective view of a camera module according to an embodiment of the present invention.
Figure 2:
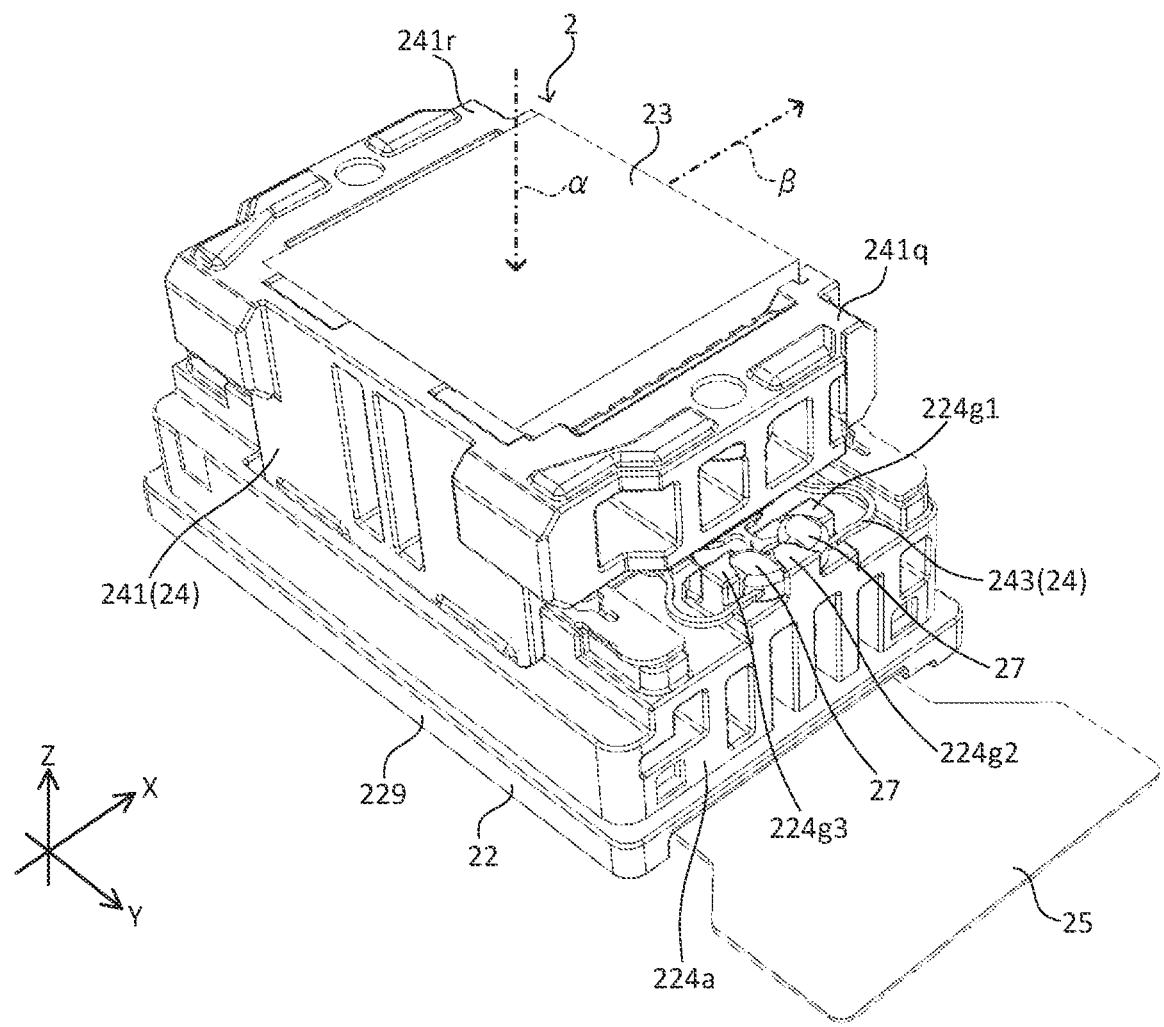
FIG. 2 is a perspective view of a prism module of the camera module in a state in which some members are omitted from the prism module.
Figure 3:
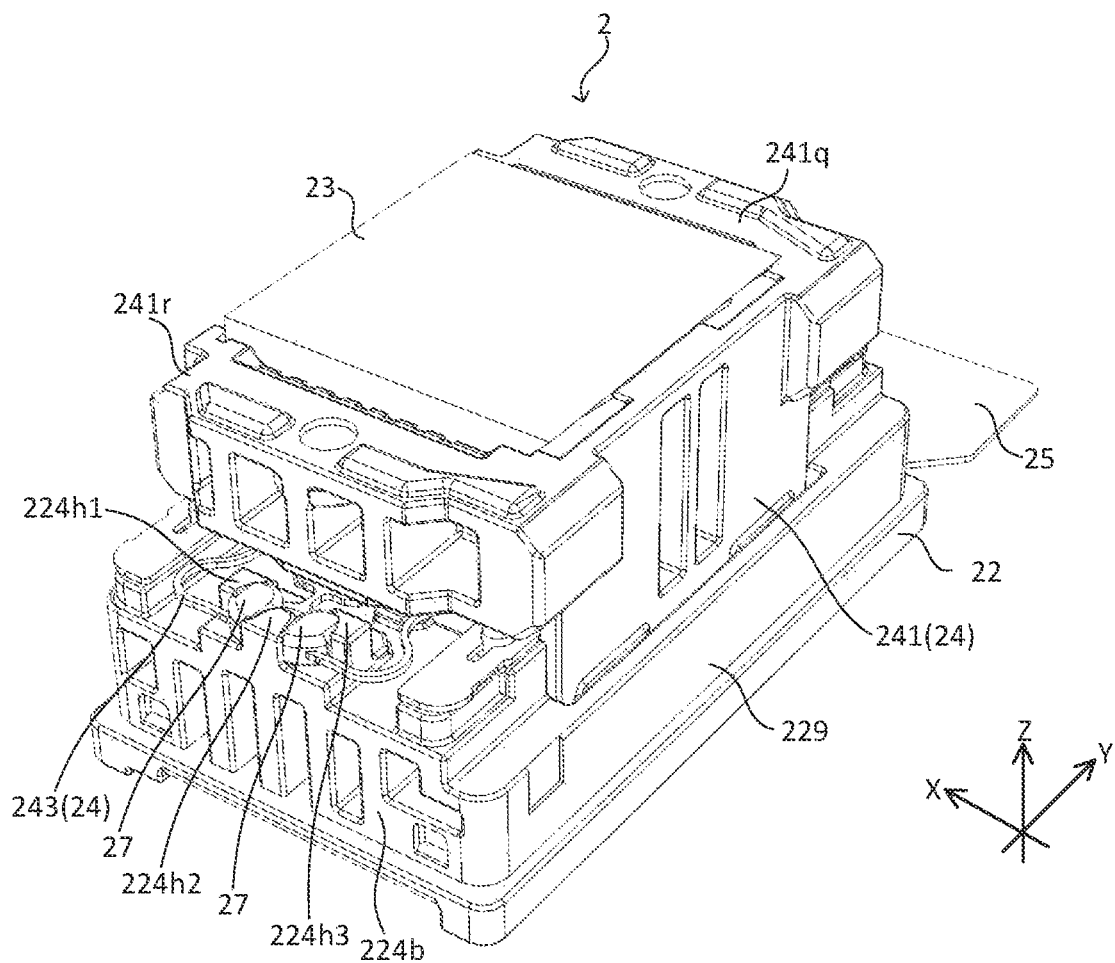
FIG. 3 is a perspective view of the prism module from which some members are omitted, in a state in which the prism module is viewed from an angle different from that in FIG. 2.

As illustrated in FIG. 1, first cover 21 is made of, for example, a synthetic resin or a non-magnetic metal. First cover 21 as such is a box-shaped member that is open on the both sides in the Z direction and on the + side in the X direction. Light from a side of the subject can enter an internal space of first cover 21 through an opening on the + side in the Z direction of first cover 21. First cover 21 as described above is combined with first base 22 to be described later from the + side in the Z direction.

<First Base>

Figure 5:
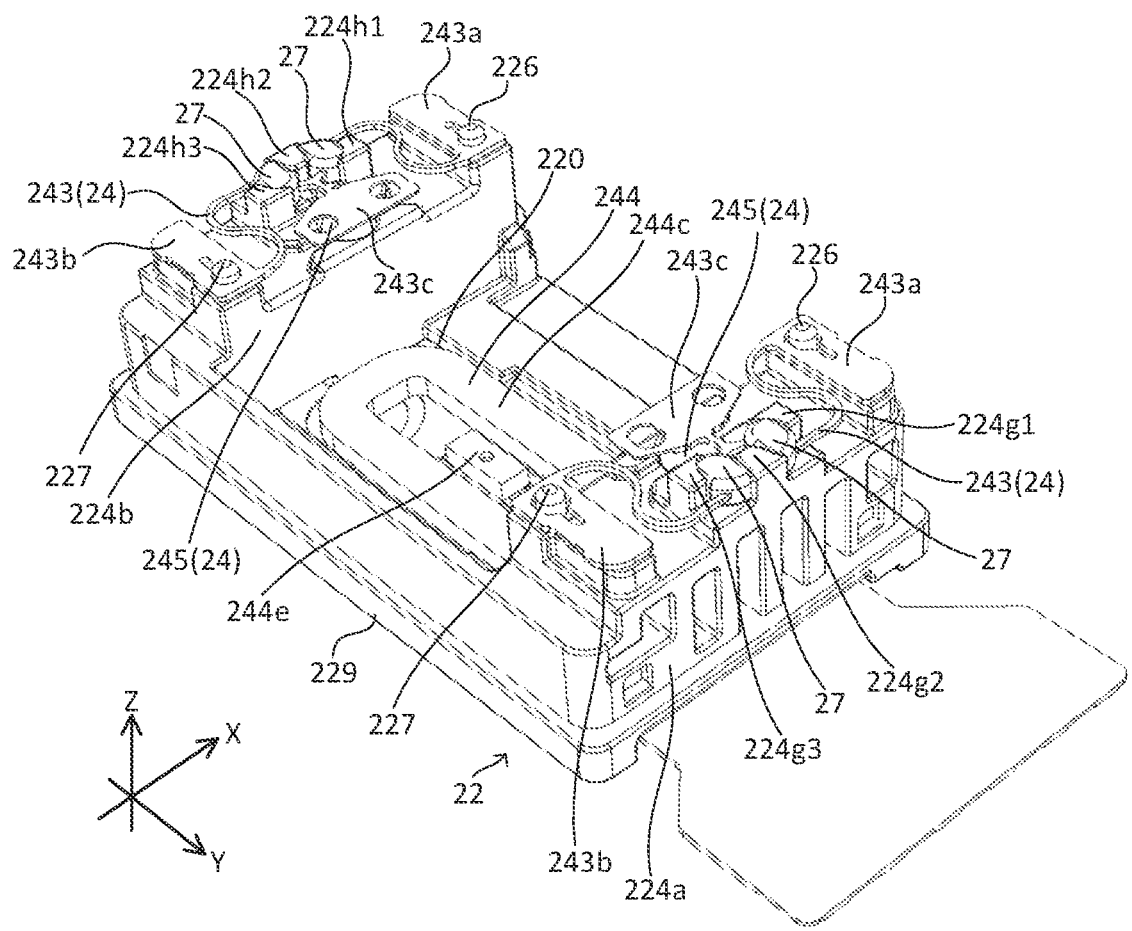
FIG. 5 is a perspective view of the first base.
Figure 6:
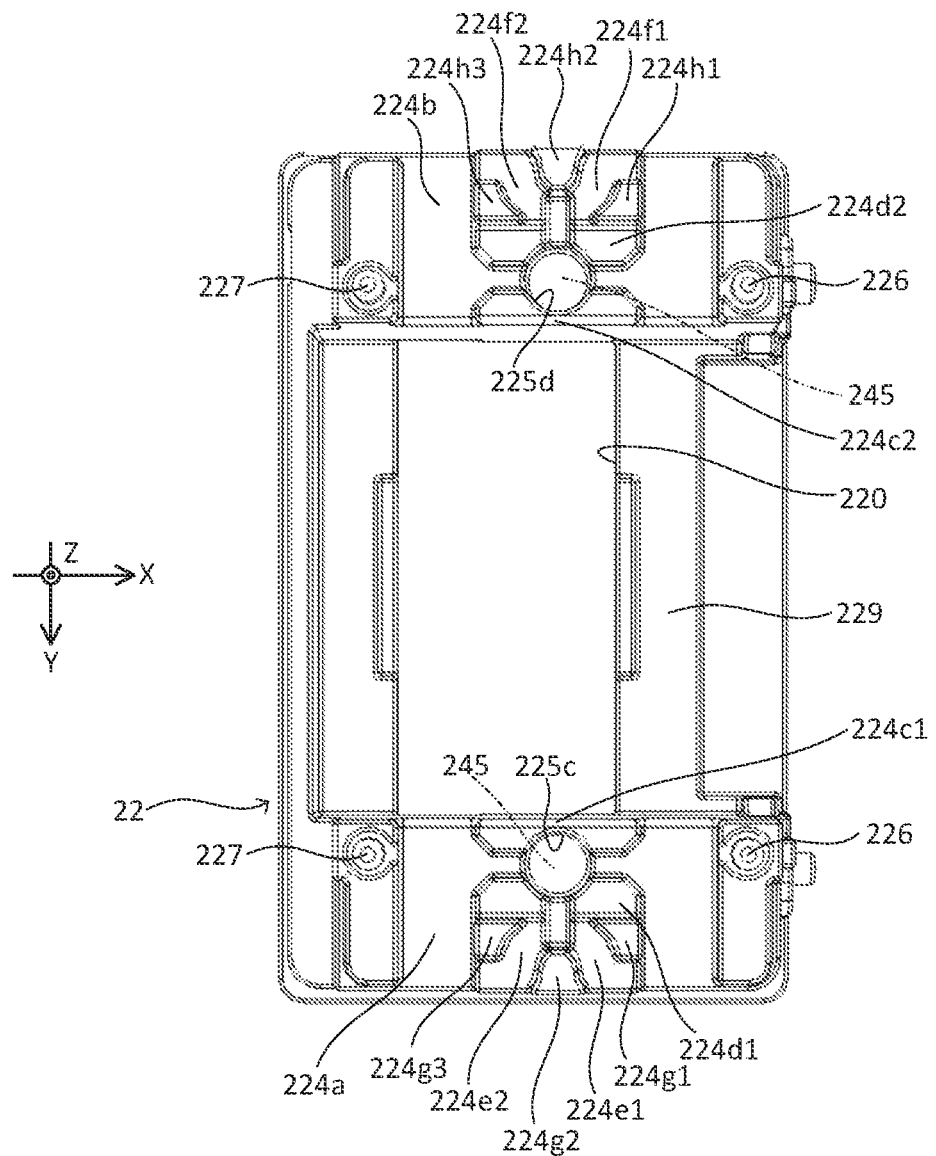
FIG. 6 is a plan view of the first base.

First base 22 will be described with reference to FIGS. 5 and 6. First base 22 is a box-shaped member that is open on the + side in the Z direction and on the + side in the X direction, respectively. First base 22 includes base-side opening 220 in bottom wall part 229 on the − side in the Z direction.

First coil 244c and first Hall element 244e of front-side OIS actuator 244 are arranged in base-side opening 220.

First base 22 supports holder 241 of first shake correction apparatus 24 to be swingable about a first axis parallel to the Y direction. For this purpose, first base 22 includes first receiver part 225c and second receiver part 225d for holding swing guide member 245 to be described later.

First receiver part 225c is provided in first side wall part 224a on the + side in the Y direction of first base 22. On the other hand, second receiver part 225d is provided in second side wall part 224b on the − side in the Y direction of first base 22.

First receiver part 225c and second receiver part 225d as such have shapes symmetrical with each other in the Y direction. Specifically, first receiver part 225c and second receiver part 225d are cylindrical recesses that open only on end surfaces (upper surfaces) on the + side in the Z direction of first side wall part 224a and second side wall part 224b, respectively.

First side wall part 224a includes first weir part 224c1 between an inner end edge in the Y direction and first receiver part 225c on the upper surface. On the other hand, second side wall part 224b includes first weir part 224c2 between an inner end edge in the Y direction and second receiver part 225d on the upper surface. Each of first weir part 224c1 and first weir part 224c2 as such contributes to prevention of an adhesive, which fixes swing guide member 245 to first receiver part 225c and second receiver part 225d, from flowing on a center side in the Y direction.

First side wall part 224a includes second weir part 224d1 in a portion surrounding a part of an outer half part in the Y direction of first receiver part 225c on the upper surface. On the other hand, second side wall part 224b includes second weir part 224d2 in a portion surrounding a part of an outer half part in the Y direction of second receiver part 225d on the upper surface. Each of second weir parts 224d1 and 224d2 as such contributes to prevention of an adhesive, which fixes swing guide member 245 to first receiver part 225c and second receiver part 225d, from flowing into the outside in the Y direction.

First side wall part 224a includes spring arrangement spaces 224e1 and 224e2 in a portion on an outer side in the Y direction of second weir part 224d1 on the upper surface. In the case of the present embodiment, spring arrangement spaces 224e1 and 224e2 are separated from each other in the X direction.

On the other hand, second side wall part 224b includes spring arrangement spaces 224f1 and 224f2 in a portion on an outer side in the Y direction of second weir part 224d2 on the upper surface. Spring arrangement spaces 224f1 and 224f2 are separated from each other in the X direction. In each of spring arrangement spaces 224e1 and 224e2 and spring arrangement spaces 224f1 and 224f2, a part (specifically, base end-side continuous part 243m) of continuous part 243i of swing support spring 243 (see FIG. 7) to be described later is arranged.

In the portion on the outer side in the Y direction of second weir part 224d1 on the upper surface, first side wall part 224a includes three protrusions 224g1, 224g2 and 224g3 in this order from the + side in the X direction. Protrusions 224g1 and 224g3 are separated from each other in the X direction and are arranged at the same position in the Y direction. Protrusion 224g2 is arranged on an outer side in the Y direction (the lower side in FIG. 6) of protrusions 224g1 and 224g3.

Spring arrangement space 224e1 is provided between protrusions 224g1 and 224g2. On the other hand, spring arrangement space 224e2 is provided between protrusions 224g2 and 224g3.

In the portion on the outer side in the Y direction of second weir part 224d2 on the upper surface, second side wall part 224b includes three protrusions 224h1, 224h2 and 224h3 in this order from the + side in the X direction. Protrusions 224h1 and 224h3 are separated from each other in the X direction and are arranged at the same position in the Y direction. Protrusion 224h2 is arranged on an outer side in the Y direction (the upper side in FIG. 6) of protrusions 224h1 and 224h3.

Spring arrangement space 224f1 is provided between protrusions 224h1 and 224h2. On the other hand, spring arrangement space 224f2 is provided between protrusions 224h2 and 224h3.

Each of first side wall part 224a and second side wall part 224b includes first positioning protrusion 226 and second positioning protrusion 227 in both end parts in the X direction on the upper surface. Each of first positioning protrusion 226 and second positioning protrusion 227 engages with a pair of swing support springs 243 (see FIG. 7) to be described later to position the pair of swing support springs 243.

<First Shake Correction Apparatus>

Figure 4:
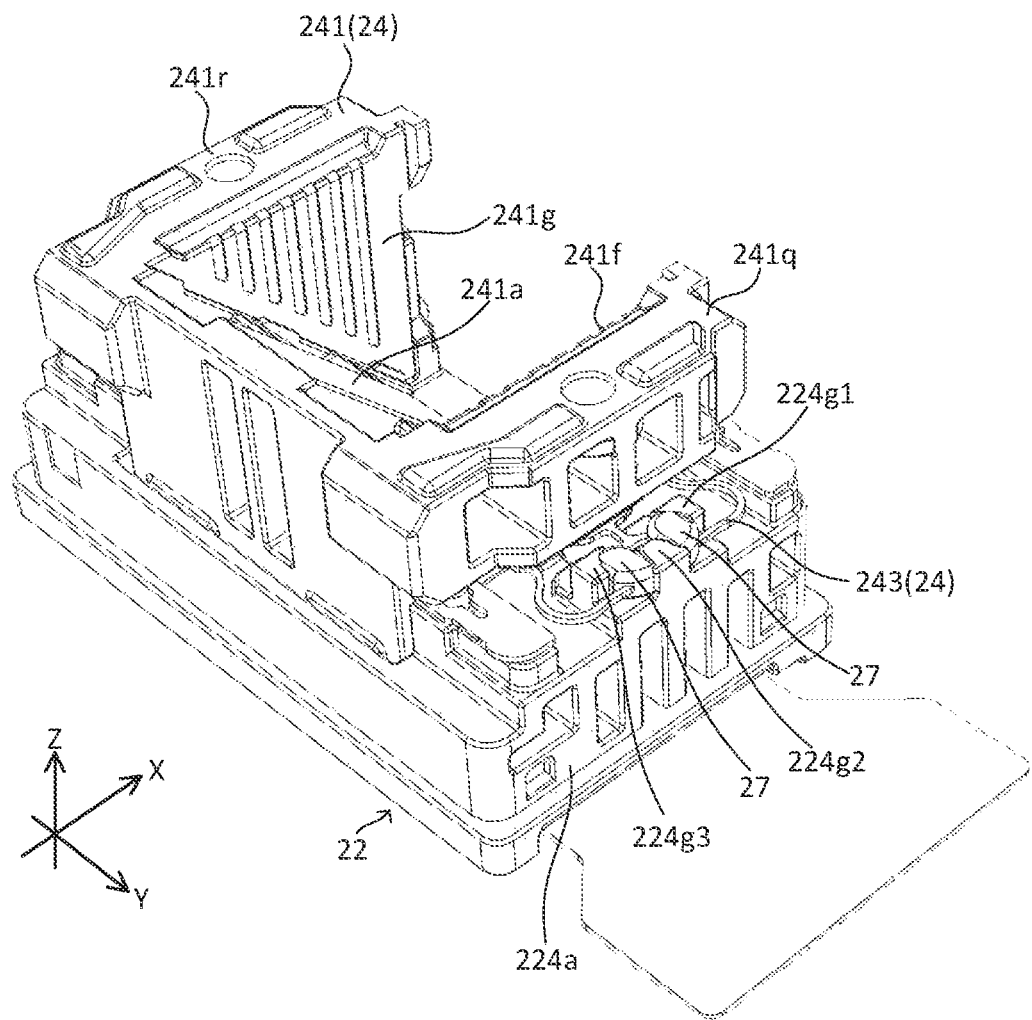
FIG. 4 is a perspective view of a state in which a holder is assembled to a first base.
Figure 8:
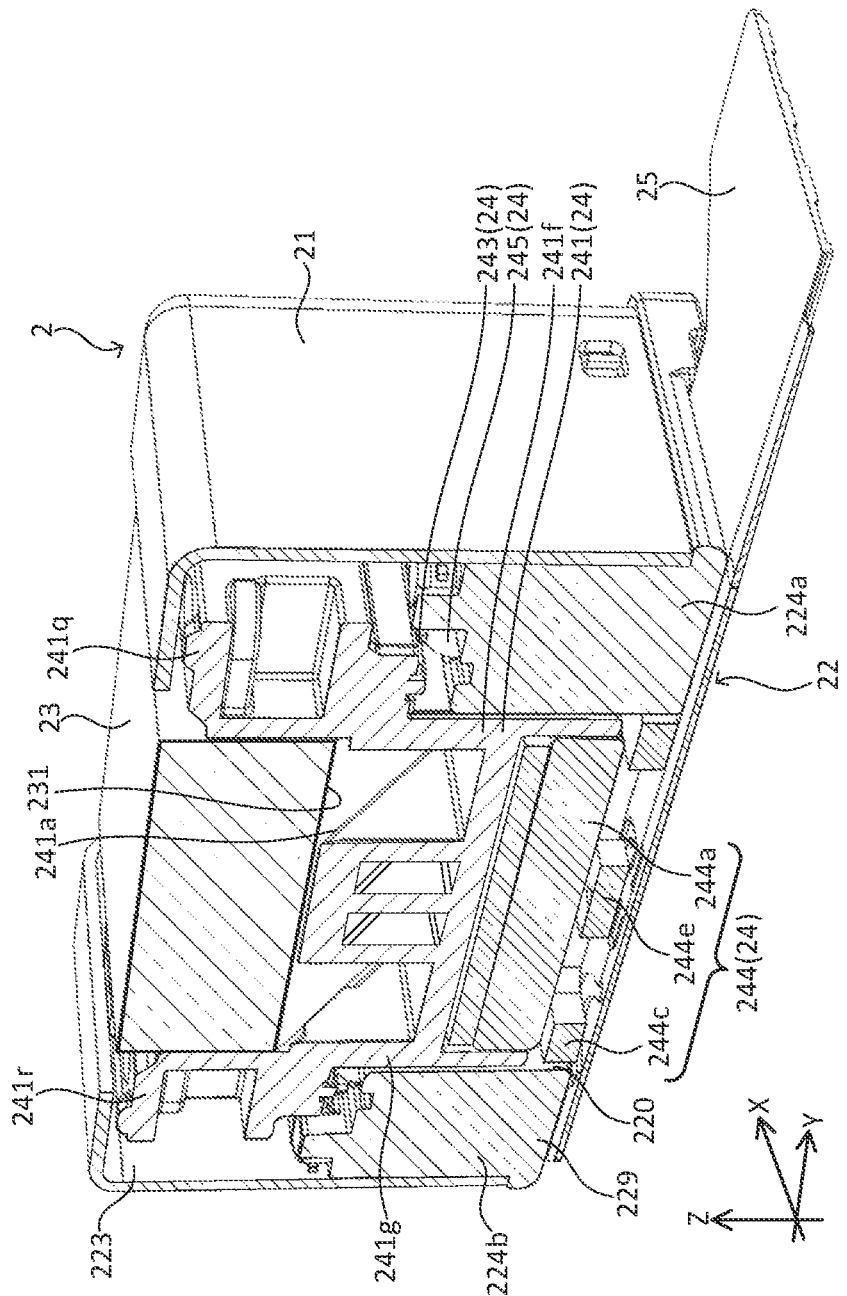
FIG. 8 is a cross-sectional view of the prism module.

First shake correction apparatus 24 will be described with reference to FIGS. 4, 5 and 8. First shake correction apparatus 24 swings prism 23 about the first axis parallel to the Y direction, and performs shake correction in a rotational direction about the first axis. First shake correction apparatus 24 is arranged in first accommodation space 223 (see FIG. 8) covered with first base 22 and first cover 21. First shake correction apparatus 24 as such corresponds to an example of the driving section.

First shake correction apparatus 24 includes a pair of swing guide members 245, the pair of swing support springs 243, holder 241, and front-side OIS actuator 244.

In first shake correction apparatus 24, holder 241 is swingably supported on first base 22. In this state, holder 241 swings about the first axis based on a driving force of front-side OIS actuator 244. When front-side OIS actuator 244 is driven under the control by control section 5 (see FIG. 18), holder 241 and prism 23 swing about the first axis parallel to the Y direction. Thus, shake in the rotational direction about the first axis is corrected. Hereinafter, specific structures of the respective members included in first shake correction apparatus 24 will be described.

<Swing Guide Member>

The pair of swing guide members 245 will be described with reference to FIGS. 5 and 6. Each of the pair of swing guide members 245 is, for example, a sphere made of a ceramic, a metal, or a synthetic resin. Swing guide member 245 that is one (that is, on the + side in the Y direction) of the pair of swing guide members 245 is arranged in first receiver part 225c of first base 22. On the other hand, swing guide member 245 that is the other (that is, on the − side in the Y direction) of the pair is arranged in second receiver part 225d of first base 22.

The pair of swing guide members 245 is fixed to first receiver part 225c and second receiver part 225d, respectively, with an adhesive. In this state, half parts on the + side in the Z direction of the pair of swing guide members 245 function as swing guide surfaces. The swing guide surfaces protrude toward the + side in the Z direction more than first receiver part 225c and second receiver part 225d.

Note that, swing guide member 245 is not limited to a sphere, and may be, for example, a hemisphere, a cylinder, or a half cylinder. Further, swing guide member 245 may be integrated with first base 22. That is, the swing guide member may be configured by a part of first base 22.

<Swing Support Spring>

Figure 7:
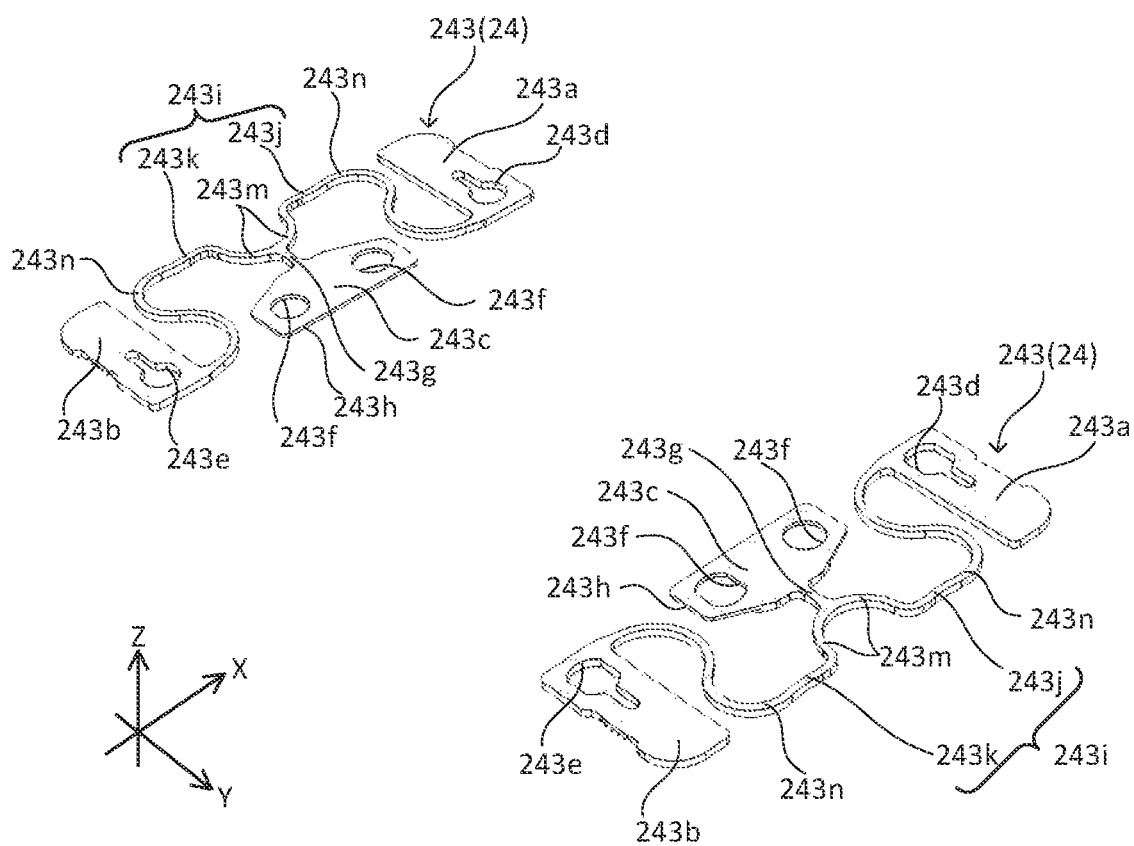
FIG. 7 is a perspective view of only swing support springs.

The pair of swing support springs 243 will be described with reference to FIGS. 5 and 7. The pair of swing support springs 243 swingably supports holder 241 to be described later on first base 22. Each of the pair of swing support springs 243 is a plate spring made of a metal and is arranged on the + side in the Z direction of the pair of swing guide members 245.

Hereinafter, swing support spring 243 that is one (that is, on the + side in the Y direction) of the pair of swing support springs 243 will be described. Swing support spring 243 that is the other (that is, on the − side in the Y direction) of the pair is symmetrical with swing support spring 243 that is the one of the pair, in the Y direction.

Swing support spring 243 that is the one of the pair includes a pair of first locking parts 243a and 243b, second locking part 243c, twist allowing part 243g, and spring-side guide surface 243h.

First locking part 243a, which is one (that is, on the + side in the X direction) of the pair of first locking parts 243a and 243b, is arranged in an end part on the + side in the X direction of swing support spring 243 that is the one of the pair. First locking part 243a as such, which is the one of the pair, includes first through-hole 243d.

On the other hand, first locking part 243b, which is the other (that is, on the − side in the X direction) of the pair, is arranged in an end part on the − side in the X direction of swing support spring 243 that is the one of the pair. First locking part 243b as such, which is the other of the pair, includes first-through hole 243e. The pair of first locking parts 243a and 243b is connected to each other by continuous part 243i extending in the X direction.

Continuous part 243i includes continuous part element 243j arranged on the + side in the X direction with respect to twist allowing part 243g to be described later and continuous part element 243k arranged on the − side in the X direction with respect to twist allowing part 243g. Continuous part element 243j connects twist allowing part 243g and first locking part 243a. On the other hand, continuous part element 243k connects twist allowing part 243g and first locking part 243b.

Hereinafter, continuous part element 243j will be described. Continuous part element 243j includes base end-side continuous part 243m and meandering continuous part 243n. Base end-side continuous part 243m and meandering continuous part 243n are connected.

In continuous part element 243j, base end-side continuous part 243m is provided in an end part on a side close to twist allowing part 243g. One end (an end part on the side close to twist allowing part 243g) of base end-side continuous part 243m is connected to twist allowing part 243g.

Meandering continuous part 243n has a substantially S shape. One end (an end part on a side close to twist allowing part 243g) of meandering continuous part 243n is connected to base end-side continuous part 243m. The other end (an end part on a side far from twist allowing part 243g) of meandering continuous part 243n is connected to first locking part 243a. Continuous part element 243k is symmetrical with continuous part element 243j in the X direction. For this reason, the same reference numerals as those of the constituent members of continuous part element 243j are used for continuous part element 243k, and a description thereof is omitted.

Surfaces on the − side in the Z direction of the pair of first locking parts 243a and 243b are bonded and fixed to an end surface on the + side in the Z direction of first side wall part 224a of first base 22. In this state, first positioning protrusion 226 of first base 22 is inserted through first through-hole 243d (see FIG. 5). Further, second positioning protrusion 227 of first base 22 is inserted through first through-hole 243e (see FIG. 5).

Note that, in the case of swing support spring 243 that is the other (on the − side in the Y direction) of the pair, the surfaces on the − side in the Z direction of the pair of first locking parts 243a and 243b are bonded and fixed to an end surface on the + side in the Z direction of second side wall part 224b of first base 22.

Second locking part 243c is provided in a portion between first locking parts 243a and 243b in the X direction via gaps therebetween in the X direction. Second locking part 243c includes a pair of second through-holes 243f.

Surfaces on the + side in the Z direction of second locking parts 243c are bonded and fixed to spring seat surfaces (not illustrated) formed on rear surfaces of overhang parts 241q and 241r of holder 241 to be described later. In this state, a pair of holder-side positioning protrusions (not illustrated) formed on the rear surfaces of overhang parts 241q and 241r of holder 241 is inserted through the pair of second through-holes 243f, respectively. Note that, in the case of swing support spring 243 that is the other (on the − side in the Y direction) of the pair, the surface on the + side in the Z direction of second locking part 243c is bonded and fixed to the spring seat surfaces (not illustrated) formed on the rear surfaces of overhang parts 241q and 241r of holder 241.

Twist allowing part 243g is a plate-like member extending in the Y direction, and connects an intermediate part (specifically, one end of each base end-side continuous part 243m) in the X direction of continuous part 243i and second locking part 243c. By being twisted, twist allowing part 243g as such allows second locking part 243c to twist with respect to first locking parts 243a and 243b.

Further, by elastic deformation, twist allowing part 243g allows relative displacement of first locking parts 243a and 243b and second locking part 243c in the Z direction.

Spring-side guide surface 243h is formed by a rear surface (that is, a surface on the − side in the Z direction) of second locking part 243c. Spring-side guide surface 243h as such abuts on the swing guide surface of swing guide member 245 described above.

The pair of swing support springs 243 is plate-like members that are entirely flat in a free state (also referred to as non-assembled state). On the other hand, in the assembled state, second locking part 243c in the pair of swing support springs 243 is arranged on the + side in the Z direction with respect to first locking parts 243a and 243b based on the elastic deformation of twist allowing part 243g.

Specifically, in the assembled state, twist allowing part 243g elastically deforms so as to be directed more toward the + side in the Z direction as twist allowing part 243g is directed more toward second locking part 243c. Based on such elastic deformation, spring-side guide surfaces 243h of the pair of swing support springs 243 urge swing guide member 245 toward the − side in the Z direction.

In the assembled state of the pair of swing support springs 243 as described above, base end-side continuous parts 243m of the pair of swing support springs 243 are arranged in spring arrangement spaces 224e1 and 224e2 and spring arrangement spaces 224f1 and 224f2, respectively. Further, damping members 27 that are gel-like are arranged in spring arrangement spaces 224e1 and 224e2 and spring arrangement spaces 224f1 and 224f2 so as to cover base end-side continuous parts 243m (see FIG. 5).

Damping member 27 is effective in suppressing resonance of the pair of swing support springs 243. From the viewpoint of suppressing resonance, damping member 27 is preferably provided near a portion, which deforms the most during use, of the pair of swing support springs 243. The portion that deforms the most during use is twist allowing part 243g. For this reason, damping members 27 preferably cover portions, which are close to twist allowing parts 243g, of the pair of swing support springs 243.

<Holder>

Holder 241 will be described with reference to FIGS. 4 and 8. Holder 241 is made of, for example, a synthetic resin and holds prism 23 on first base 22 in a state in which prism 23 is swingable with respect to first base 22.

Holder 241 includes mounting surface 241a, a pair of opposing wall parts 241f and 241g, and a pair of overhang parts 241q and 241r.

Mounting surface 241a faces the rear side (the − side in the Z direction) of optical path bending surface 231 of prism 23. Mounting surface 241a includes, for example, a surface parallel to optical path bending surface 231. Note that, the structure of mounting surface 241a is not limited to that of the present embodiment, and mounting surface 241a may be a boss having a shape that enables positioning of prism 23, for example.

Each of the pair of opposing wall parts 241f and 241g is a plate-like member parallel to the XZ plane, and is arranged in a state of being separated from each other in the Y direction. The pair of opposing wall parts 241f and 241g as such is arranged to sandwich mounting surface 241a from the Y direction.

The pair of overhang parts 241q and 241r is provided in the pair of opposing wall parts 241f and 241g, respectively. Each of the pair of overhang parts 241q and 241r as such swingably supports holder 241 on first base 22.

Specifically, overhang part 241q, which is one (that is, on the + side in the Y direction) of the pair, overhangs on the + side in the Y direction from the + side surface in the Y direction of opposing wall part 241f.

On the other hand, overhang part 241r, which is the other (that is, on the − side in the Y direction) of the pair, overhangs on the − side in the Y direction from the − side surface in the Y direction of opposing wall part 241g. Further, each of the pair of overhang parts 241q and 241r includes the spring seat surface (not illustrated) having a flat surface shape on the rear surface (that is, the surface on the − side in the Z direction). The spring seat surface includes the pair of holder-side positioning protrusions (not illustrated) protruding on the − side in the Z direction at two points separated from each other in the X direction.

The surfaces on the + side in the Z direction of second locking parts 243c of the pair of swing support springs 243 are bonded and fixed to the spring seat surfaces, respectively. In this state, the pair of holder-side positioning protrusions is inserted through the pair of second through-holes 243f of swing support spring 243, respectively. With this structure, holder 241 is swingably supported on first base 22.

Note that, outer end parts in the Y direction of overhang parts 241q and 241r of holder 241 are located on center sides in the Y direction rather than the both end surfaces in the Y direction of first base 22. Such a configuration contributes to a reduction in the size and weight of holder 241.

<Front-Side OIS Actuator>

Front-side OIS actuator 244 that is an actuator for displacing an optical path bending member will be described with reference to FIGS. 5 and 8. Front-side OIS actuator 244 swings holder 241 about the first axis. The first axis is an axis parallel to the Y direction. Specifically, the first axis is an axis parallel to the Y axis that passes through abutting parts between the swing guide surfaces of the pair of swing guide members 245 and spring-side guide surfaces 243h of the pair of swing support springs 243.

Front-side OIS actuator 244 is arranged on the rear sides (that is, on the − side in the Z direction) of prism 23 and holder 241 so as to overlap optical path bending surface 231 of prism 23 and holder 241 in the Z direction (that is, a direction of the first optical axis). Front-side OIS actuator 244 includes first magnet 244a, first coil 244c, and first Hall element 244e.

First magnet 244a is fixed to a rear side surface (that is, a surface on the − side in the Z direction) of holder 241 that is a movable-side member. First magnet 244a is composed of two magnet elements adjacent in the X direction. These respective magnet elements are magnetized in the Z direction and include one magnetic pole on one side. The directions of the magnetic poles of the respective magnet elements are opposite to each other.

First coil 244c and first Hall element 244e are fixed to a front surface (that is, a surface on the + side in the Z direction) of flexible printed circuit board (hereinafter, referred to as FPC) 25 fixed to a rear side surface of first base 22.

First coil 244c and first Hall element 244e are arranged in base-side opening 220 of first base 22. Note that, first coil 244c is a so-called air-core coil having an oval shape. First Hall element 244e is arranged on the inner side in the radial direction of first coil 244c.

Figure 18:
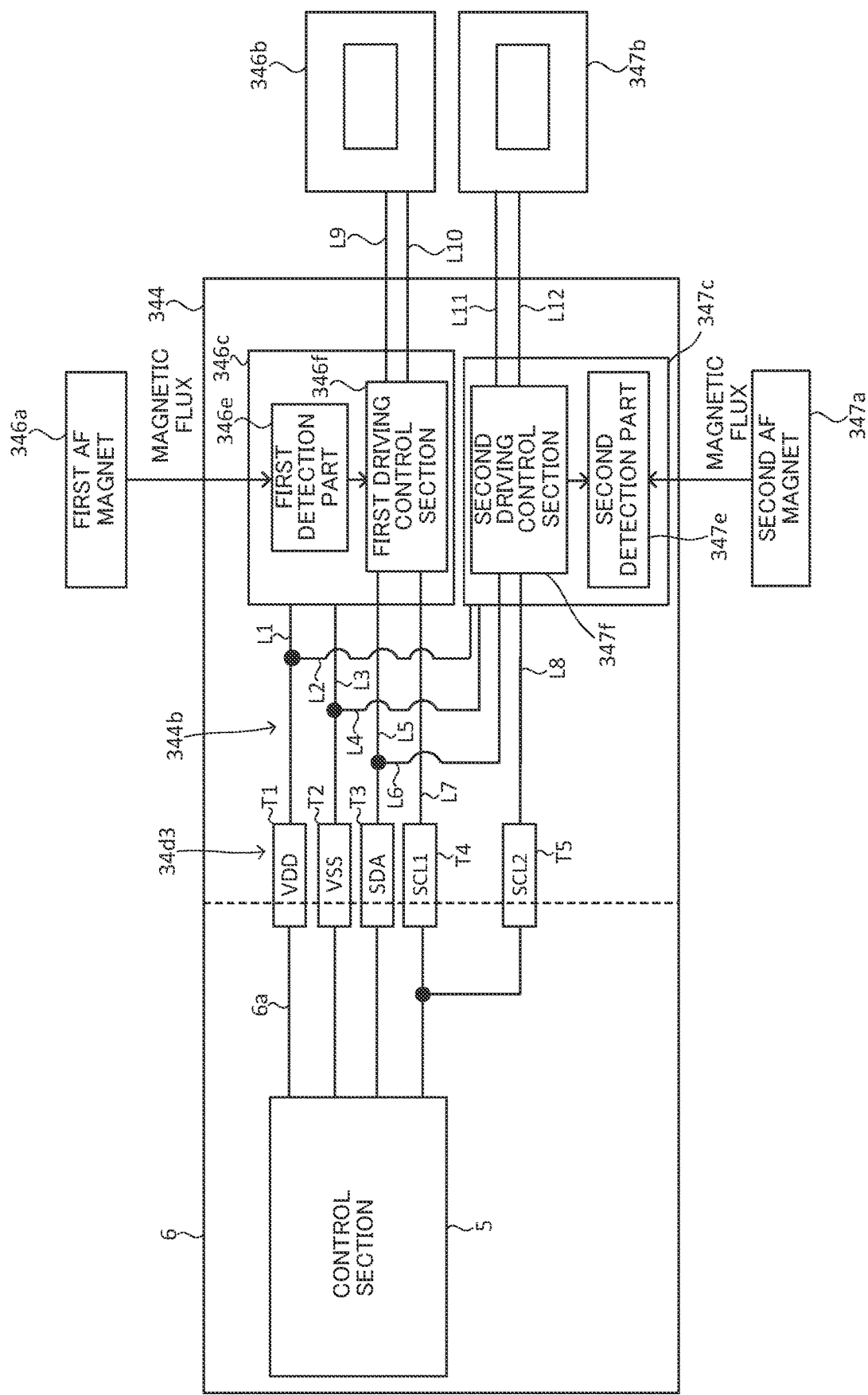
FIG. 18 is a circuit diagram of an AF driving control circuit.
Figure 19:
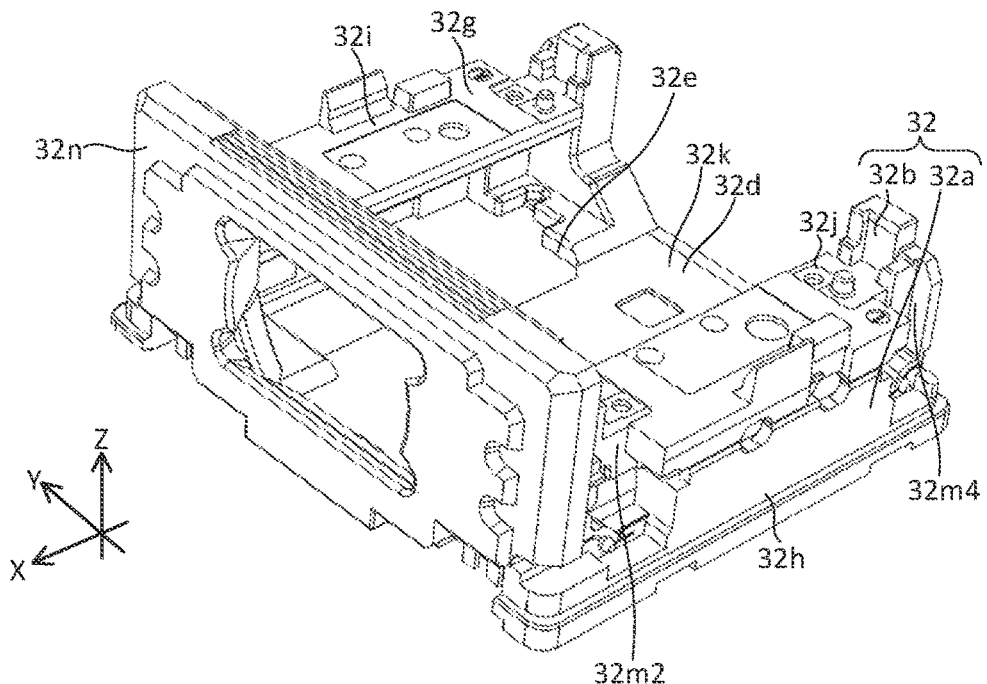
FIG. 19 is a perspective view of the second base.
Figure 20:
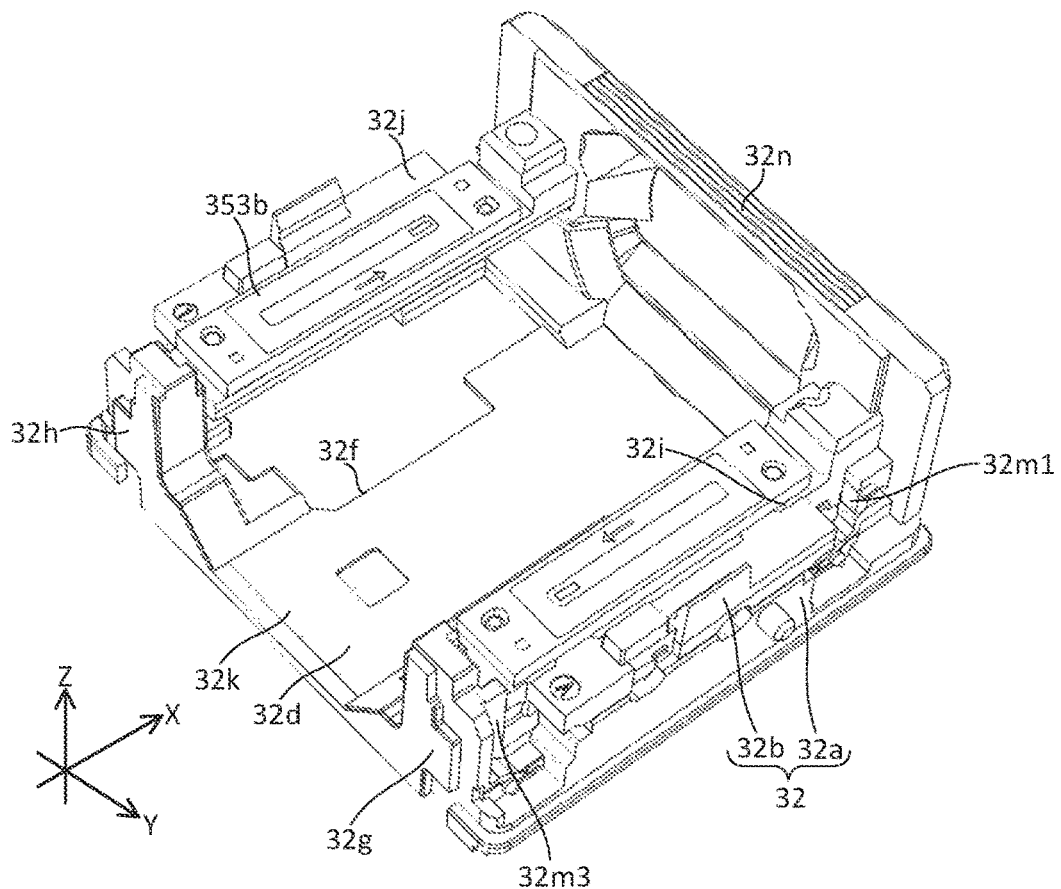
FIG. 20 is a perspective view of the second base viewed from an angle different from that in FIG. 19.

Front-side OIS actuator 244 having the configuration as described above swings holder 241 about the first axis under the control by control section 5 (see FIG. 18).

<Lens Module>

Next, lens module 3 will be described with reference to FIGS. 1 and 9A to 26B. Lens module 3 includes second cover 31, second base 32, lens part 33, AF apparatus 34, and second shake correction apparatus 35.

<Second Cover>

Figure 9A:
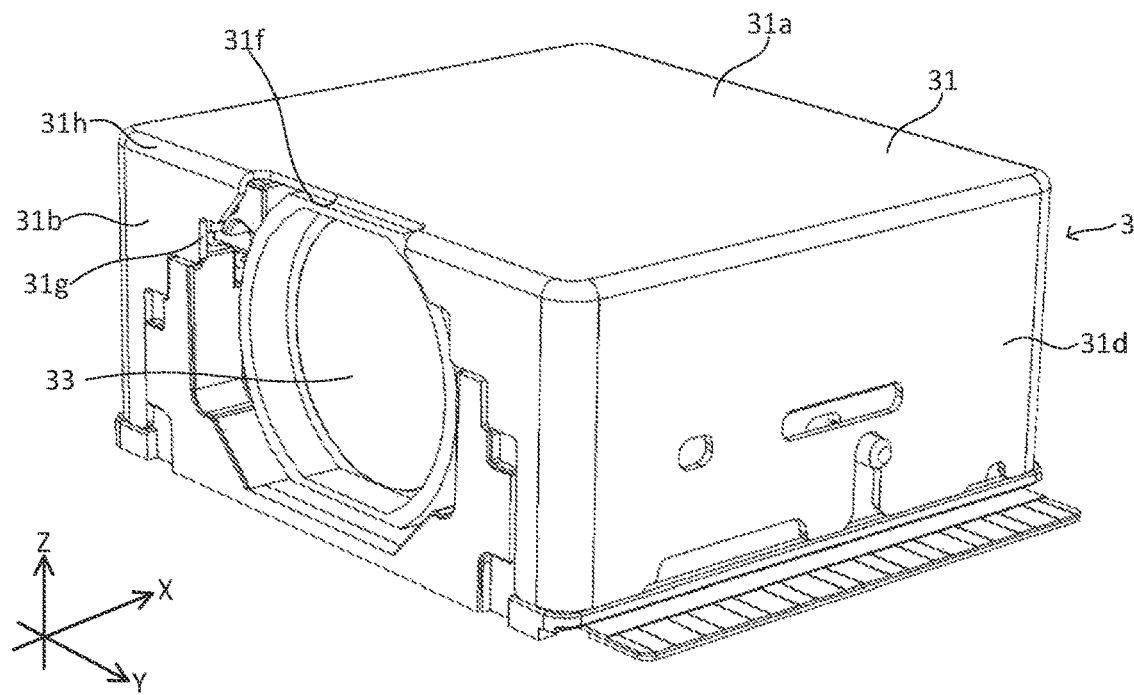
FIG. 9A is a perspective view of a lens module.
Figure 9B:
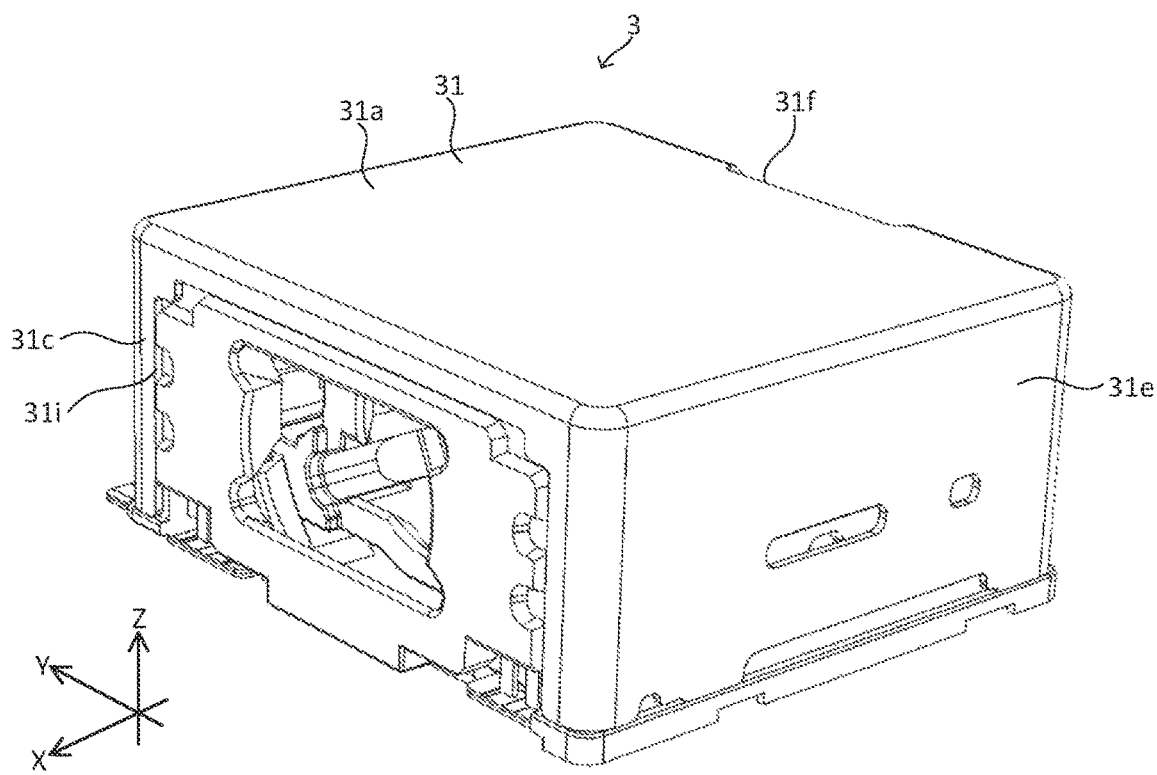
FIG. 9B is a perspective view of the lens module viewed from an angle different from that in FIG. 9A.

Second cover 31 will be described with reference to FIGS. 1, 9A and 9B. Second cover 31 is made of, for example, a synthetic resin or a non-magnetic metal, and is a box-shaped member that is open on the both sides in the X direction and on the − side in the Z direction (that is, the rear side).

Specifically, second cover 31 includes top plate part 31a, front plate part 31b, rear plate part 31c, first side plate part 31d, and second side plate part 31e.

Top plate part 31a is a plate member having a rectangular shape. Top plate part 31a as such is arranged on the + side in the Z direction of second cover 31. Top plate part 31a includes notch part 31f in one end part in the X direction (the one end part is an end part on a side of prism module 2 (see FIG. 1) and on the − side in the X direction).

Notch part 31f is notched from an end part on the − side in the X direction of top plate part 31a toward the + side in the X direction. Notch part 31f as such has a rectangular shape that is long in the Y direction in plan view.

Front plate part 31b is a plate-like member having a rectangular shape, and extends on the − side in the Z direction from the end part on the − side in the X direction of top plate part 31a. Front plate part 31b includes front-side opening 31g in a portion including a central part of front plate part 31b. Front-side opening 31g has a size that allows an end surface on the − side in the X direction of lens part 33 to be exposed on the − side in the X direction. Light from prism module 2 passes through front-side opening 31g and enters lens part 33.

Further, front-side opening 31g is continuous with notch part 31f of top plate part 31a. Accordingly, an edge part on the + side in the Z direction of front-side opening 31g is not present in corner part 31h formed by top plate part 31a and front plate part 31b. Such a configuration makes it possible to facilitate processing of front-side opening 31g.

Rear plate part 31c is a plate-like member having a rectangular shape, and extends on the − side in the Z direction from an end part on the + side in the X direction of top plate part 31a. Rear plate part 31c includes rear-side opening 31i in a portion including a central part of rear plate part 31c. Rear-side opening 31i has a size that allows an end surface on the + side in the X direction of lens part 33 to be exposed on the + side in the X direction. Light from lens part 33 passes through rear-side opening 31i and enters imaging element module 4.

First side plate part 31d is a plate-like member having a rectangular shape, and extends on the − side in the Z direction from an end part on the + side in the Y direction of top plate part 31a. Further, second side plate part 31e is a plate-like member having a rectangular shape, and extends on the − side in the Z direction from an end part on the − side in the Y direction of top plate part 31a. Second cover 31 as described above is combined with second base 32 to be described later from the + side in the Z direction.

<Second Base>

Second base 32 will be described with reference to FIGS. 10A, 10B and 19 to 23. Second base 32 is combined with second cover 31 that is already described, thereby forming second accommodation space 32c (see FIG. 1) in which lens part 33, AF apparatus 34, and second shake correction apparatus 35 can be arranged.

Second base 32 is formed by a combination of lower-side base element 32a and upper-side base element 32b.

Second base 32 includes bottom part 32d and a pair of second side wall parts 32g and 32h. Bottom part 32d includes a base made of a synthetic resin and reinforcing plate 32k made of a metal and insert-molded on the base. Reinforcing plate 32k as such contributes to an increase in the rigidity of bottom part 32d and a decrease in the thickness of bottom part 32d.

On the − side in the Z direction with respect to lens guide 341 to be described later, reinforcing plate 32k of second base 32 is arranged so as to overlap lens guide 341. Specifically, lens guide 341 is present on the + side in the Z direction of reinforcing plate 32k, at whichever position lens guide 341 is present in a range in which lens guide 341 is movable during autofocus operation (that is, a range in which lens guide 341 is movable in the X direction) and in a range in which lens guide 341 is movable during shake correction operation (that is, a range in which lens guide 341 is movable in the Y direction). For this reason, a front surface (that is, a surface on the + side in the Z direction) of reinforcing plate 32k is always covered with lens guide 341 and is not exposed. Accordingly, light reflected by reinforcing plate 32k is prevented from entering lens part 33 and further an imaging element of imaging element module 4 to be described later.

Figure 22:
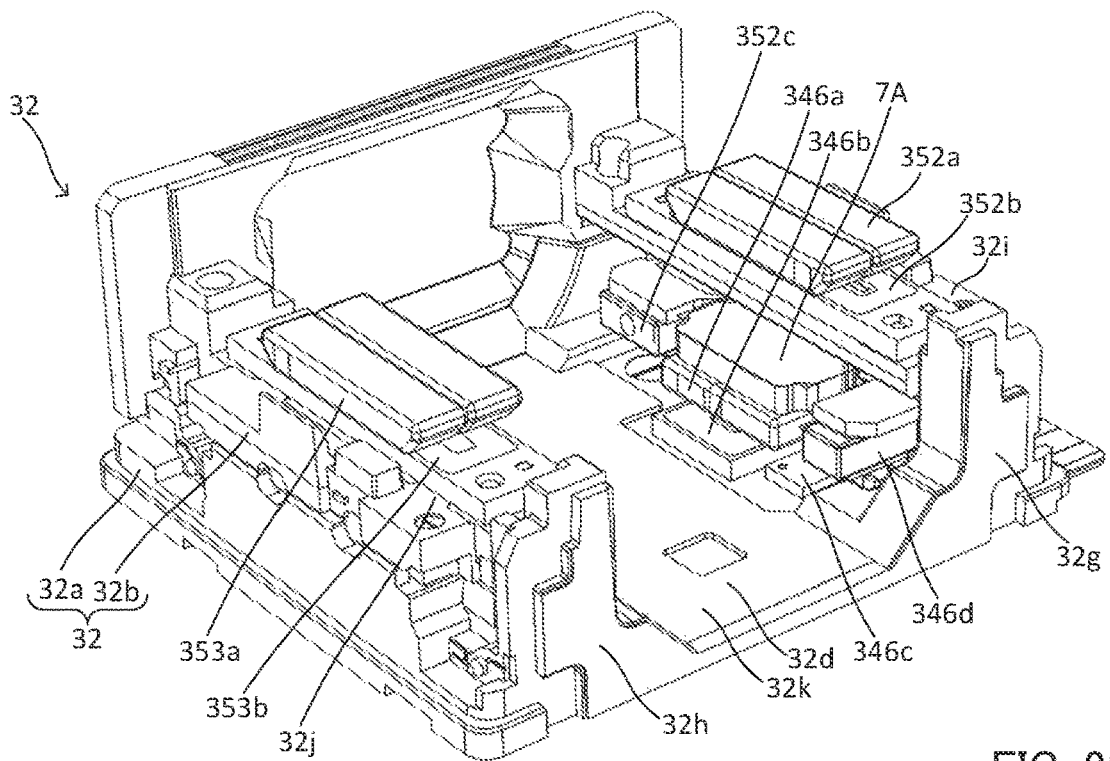
FIG. 22 is a perspective view of the second base, the AF actuator, and the rear-side OIS actuator.
Figure 23:
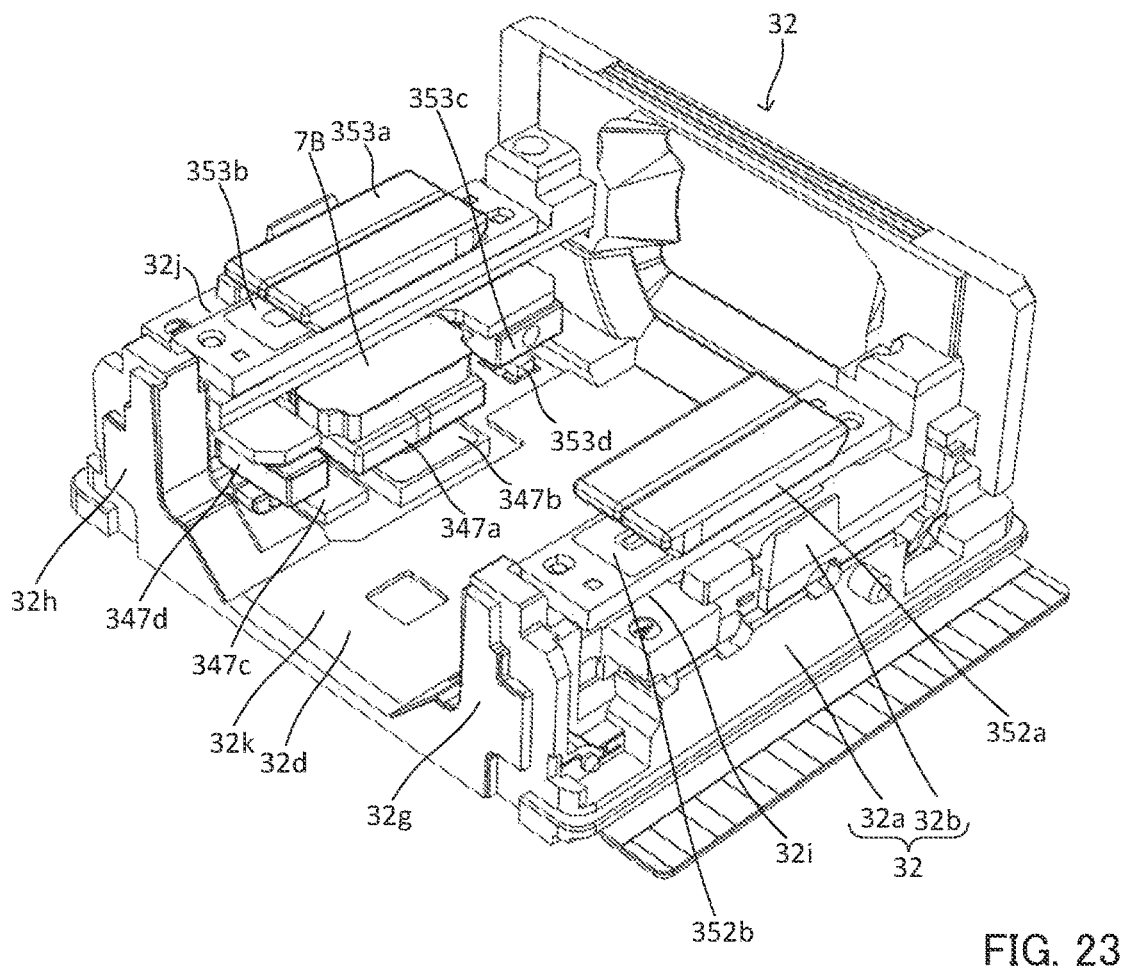
FIG. 23 is a perspective view of the second base, the AF actuator, and the rear-side OIS actuator viewed from an angle different from that in FIG. 22.

Second base 32 includes bottom through-holes 32e and 32f (see FIGS. 19 and 20) in respective parts on both sides in the Y direction of reinforcing plate 32k in bottom part 32d. As illustrated in FIGS. 22 and 23, first AF coil 346b and second AF coil 347b of AF actuator 345 to be described later are arranged in bottom through-holes 32e and 32f, respectively.

Figure 21A:
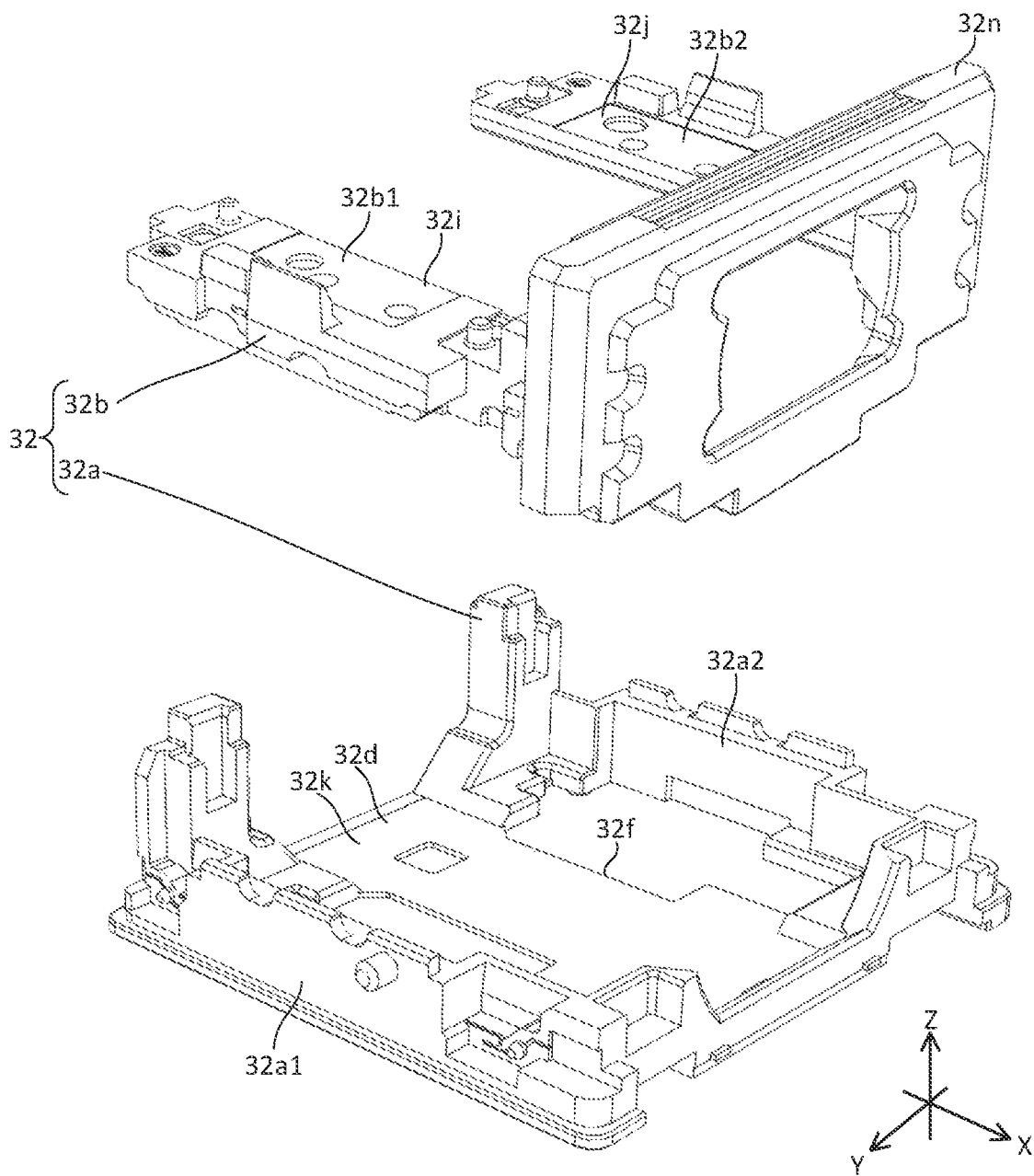
FIG. 21A is an exploded perspective view of the second base.

Each of second side wall parts 32g and 32h extends on the + side in the Z direction from both end parts in the Y direction of bottom part 32d. As illustrated in FIG. 21A, second side wall part 32g is formed by a combination of second lower wall element 32a1 of lower-side base element 32a and second upper wall element 32b1 of upper-side base element 32b. Further, second side wall part 32h is formed by a combination of second lower wall element 32a2 of lower-side base element 32a and second upper wall element 32b2 of upper-side base element 32b.

As illustrated in FIGS. 22 and 23, second side wall parts 32g and 32h include coil mount parts 32i and 32j, respectively. On respective coil mount parts 32i and 32j as such, first OIS coil 352b and second OIS coil 353b of second shake correction apparatus 35 to be described later are mounted. In the case of the present embodiment, coil mount parts 32i and 32j are provided on upper surfaces of second upper wall elements 32b1 and 32b2 of upper-side base element 32b.

Coil mount part 32i is arranged between first overhang part 34a1 and second overhang part 34a3 (see FIG. 11) of lens guide 341 in the Z direction. Further, coil mount part 32j is arranged between first overhang part 34a2 and second overhang part 34a4 (see FIG. 12) of lens guide 341 in the Z direction.

Figure 21B:
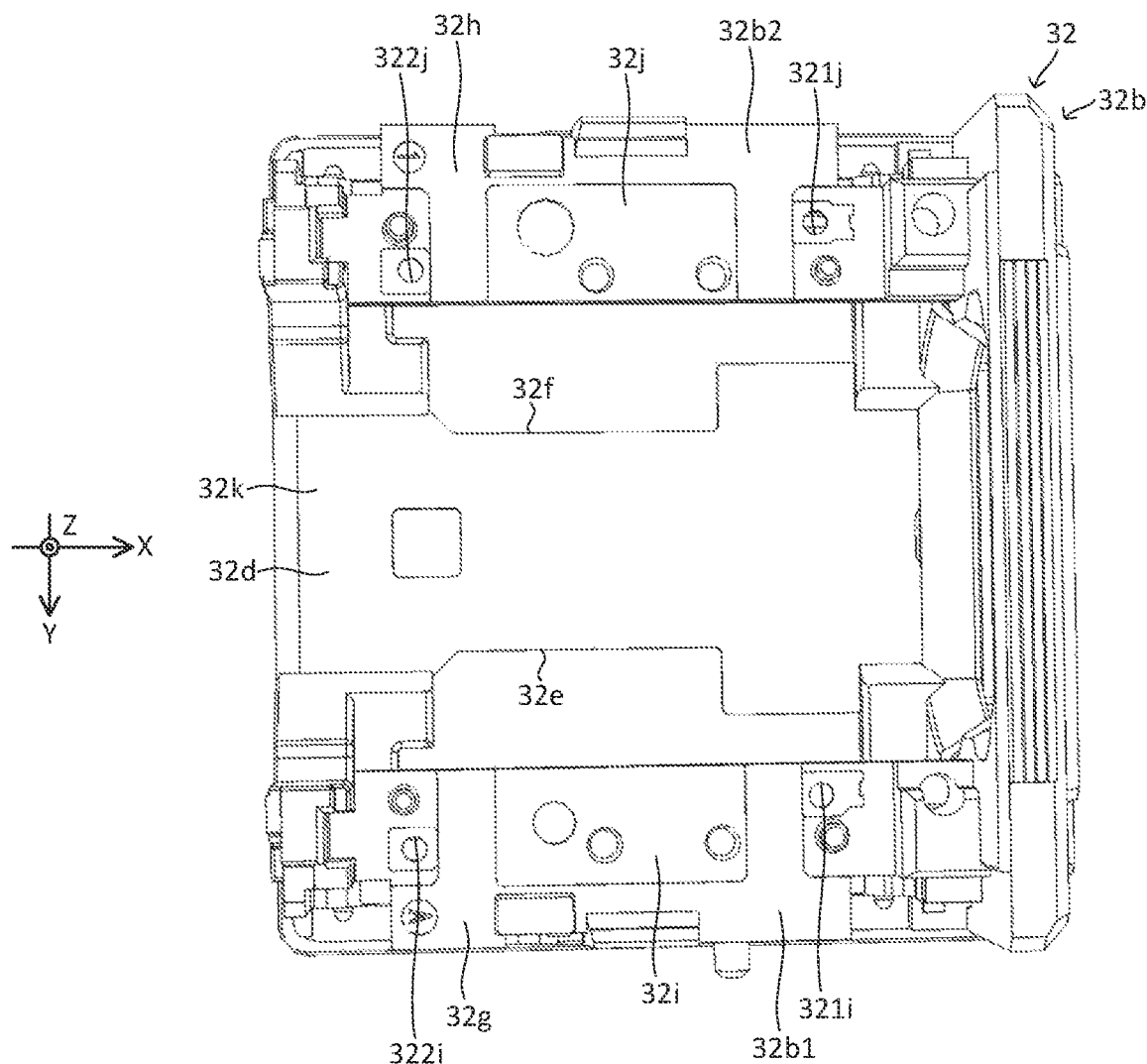
FIG. 21B is a plan view of the second base.

Second upper wall element 32b1 of upper-side base element 32b includes a pair of connection holes 321i and 322i (see FIG. 21B). Connection hole 321i is provided in an end part on the + side in the X direction of second upper wall element 32b1. Connection hole 322i is provided in an end part on the − side in the X direction of second upper wall element 32b1. Each of connection holes 321i and 322i passes through second upper wall element 32b1 in the Z direction. Solder (not illustrated) is arranged inside connection holes 321i and 322i as such.

The solder provided inside connection holes 321i and 322i connects first OIS coil 352b arranged in coil mount part 32i and first terminal part 34d1 (see FIGS. 11 and 16) of FPC 344 arranged on the − side in the Z direction with respect to second upper wall element 32b1. Such solder is supplied to each of connection holes 321i and 322i through openings on the − side in the Z direction of connection holes 321i and 322i by a dispenser or the like.

Second upper wall element 32b2 of upper-side base element 32b includes a pair of connection holes 321j and 322j (see FIG. 21B). Connection hole 321j is provided in an end part on the + side in the X direction of second upper wall element 32b2. Connection hole 322j is provided in an end part on the − side in the X direction of second upper wall element 32b2. Each of connection holes 321j and 322j passes through second upper wall element 32b2 in the Z direction. Solder (not illustrated) is arranged inside connection holes 321j and 322j as such.

The solder provided inside connection holes 321j and 322j connects second OIS coil 353b arranged in coil mount part 32j and second terminal part 34d2 (see FIGS. 12 and 17) of FPC 344 arranged on the − side in the Z direction with respect to second upper wall element 32b2. Such solder is supplied to each of connection holes 321j and 322j through openings on the − side in the Z direction of connection holes 321j and 322j by a dispenser or the like.

Further, as illustrated in FIG. 22, first AF magnet 346a of AF actuator 345 to be described later is arranged between coil mount part 32i and bottom part 32d. Further, as illustrated in FIG. 23, second AF magnet 347a of AF actuator 345 is arranged between coil mount part 32j and bottom part 32d. First AF magnet 346a and second AF magnet 347a are held by lens guide 341 to be described later.

In the case of the present embodiment, bottom through-holes 32e and 32f and coil mount parts 32i and 32j overlap each other with prescribed distance gaps therebetween in the Z direction. Accordingly, first AF coil 346b and second AF coil 347b arranged in bottom through-holes 32e and 32f and first OIS coil 352b and second OIS coil 353b mounted on coil mount parts 32i and 32j overlap each other with prescribed distance gaps therebetween in the Z direction.

Further, second side wall part 32g includes, in both end parts in the X direction on a side surface on the + side in the Y direction, spring arrangement parts 32m1 and 32m3 (see FIGS. 10A and 20) for arranging springs 3421 and 3423 to be described later. On the other hand, second side wall part 32h includes, in both end parts in the X direction on a side surface on the − side in the Y direction, spring arrangement parts 32m2 and 32m4 (see FIGS. 10B and 19) for arranging springs 3422 and 3424 to be described later.

Further, second base 32 includes reference part 32n in an end part on the + side in the X direction. Reference part 32n is a plate-like member provided in the end part on the + side in the X direction of second base 32. Reference part 32n includes in a central part a through-hole through which light having passed through lens part 33 is guided to imaging element module 4. A side surface on the + side in the X direction of reference part 32*n* serves as a reference surface in the X direction of imaging element module 4 to be described later. Reference part 32*n* as such is a member for positioning imaging element module 4.

Further, reference part 32*n* includes, on a side surface on the − side in the X direction, first reference surface 32*n*1 (see FIGS. 20 and 26B) that serves as a reference surface in the X direction of lens guide 341 to be described later. First reference surface 32*n*1 as such also serves as a reference during calibration to be described later.

<Lens Part>

Lens part 33 is arranged in second accommodation space 32*c* (see FIG. 1), in a state in which lens part 33 is held by lens guide 341 to be described later. Lens part 33 as such includes, as illustrated in FIGS. 10A to 12, lens barrel 33A having a cylindrical shape and one or more lenses 33B held by lens barrel 33A. As an example, lens part 33 includes a 3× or more optical telephoto lens group, for example, which is fixed between an end part on the − side in the X direction of lens barrel 33A and an end part on the + side in the X direction of lens barrel 33A. Note that, the structure of lens part 33 is not limited to the aforementioned structure.

<AF Apparatus>

AF apparatus 34 will be described with reference to FIGS. 10A to 18. AF apparatus 34 displaces lens part 33 in the X direction for the purpose of autofocusing. Specifically, AF apparatus 34 includes lens guide 341, first support mechanism 342, FPC 344, and AF actuator 345. AF apparatus 34 corresponds to an example of the driving section.

<Lens Guide>

Figures 11, 12:
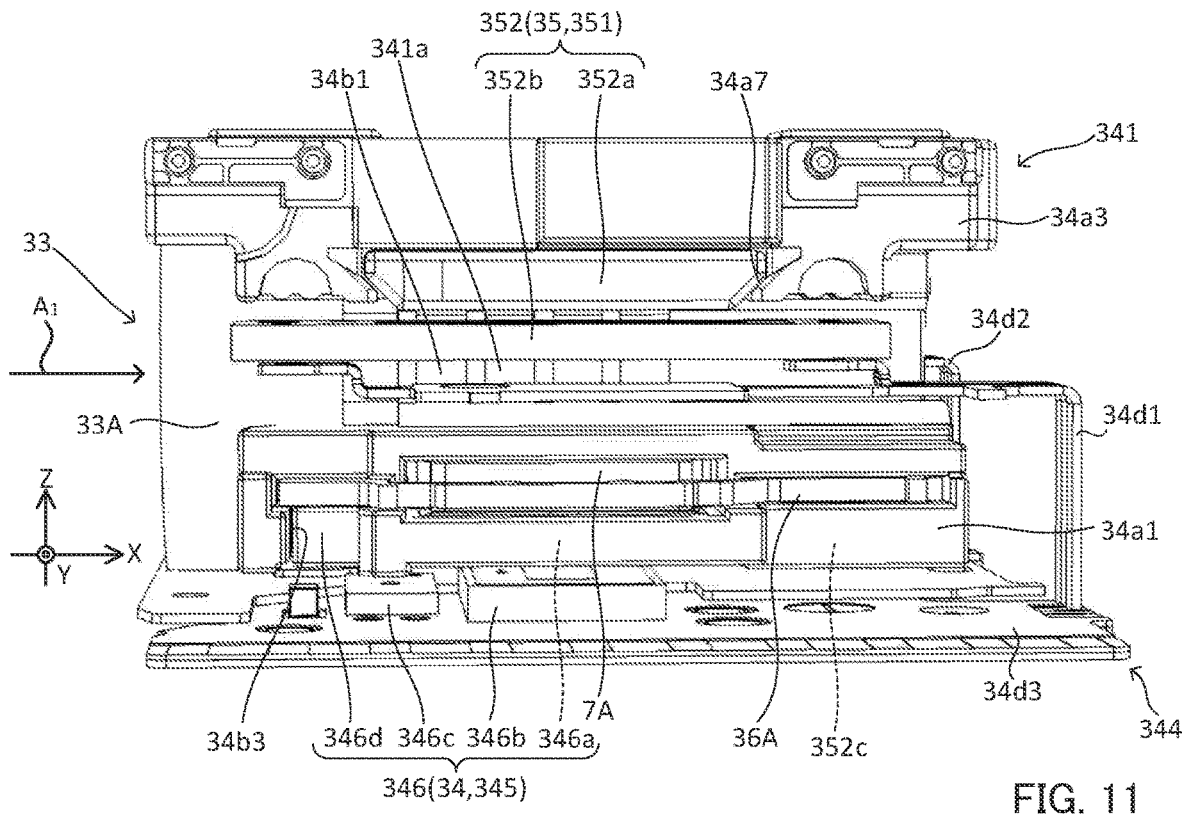
FIG. 11 is a side view of the lens module from which a second base is omitted.
FIG. 12 is a side view of the lens module from which the second base is omitted, in a state in which the lens module is viewed from a side opposite to that in FIG. 11.
Figure 13:
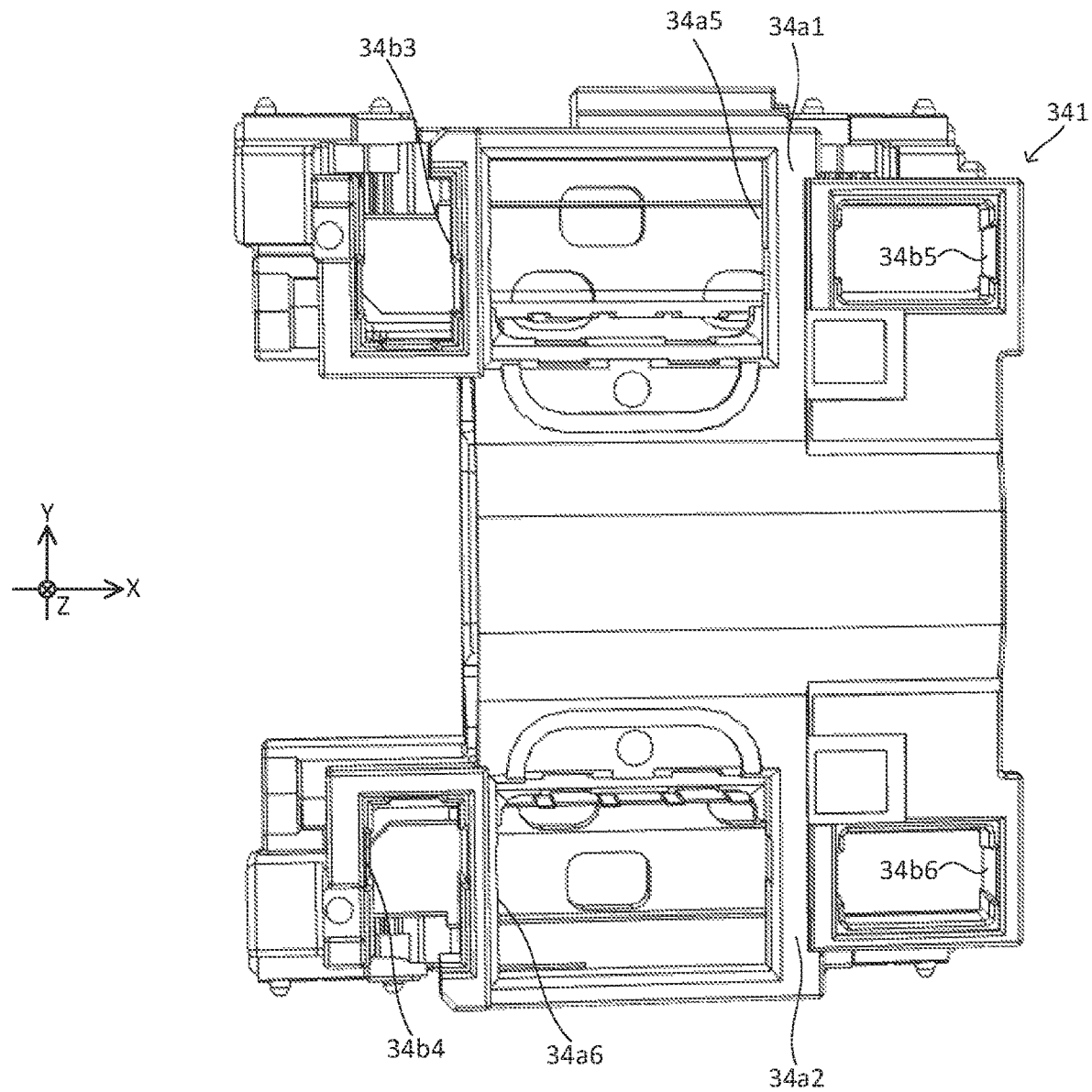
FIG. 13 is a bottom view of a lens guide.
Figure 14:
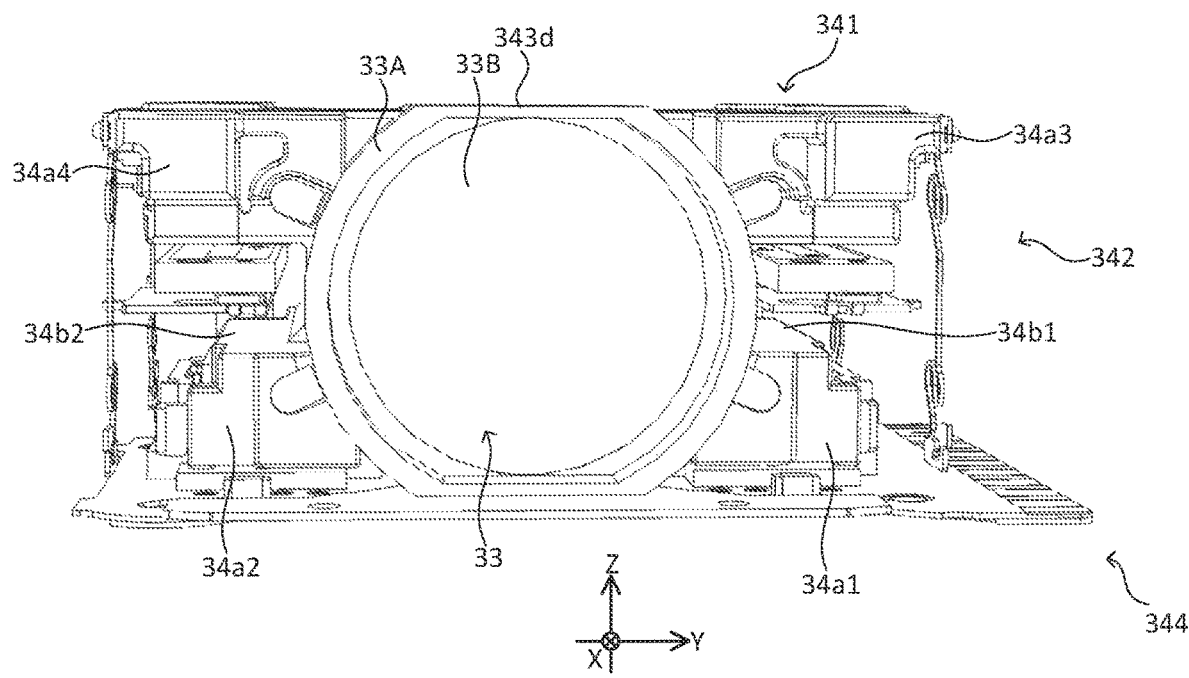
FIG. 14 illustrates the lens module from which some members are omitted, viewed from a direction of arrow $A_1$ of FIG. 11.

Lens guide 341 will be described with reference to FIGS. 11 to 14. FIG. 11 illustrates lens module 3 in a state in which some members are omitted from lens module 3, viewed from the + side in the Y direction. FIG. 12 illustrates lens module 3 in a state in which some members are omitted from lens module 3, viewed from the − side in the Y direction. FIG. 14 illustrates lens module 3 in a state in which second base 32 is omitted from lens module 3, viewed from the − side in the X direction.

Lens guide 341 includes lens holding part 341*a* having a cylindrical shape, a pair of first overhang parts 34*a*1 and 34*a*2, and a pair of second overhang parts 34*a*3 and 34*a*4. Lens guide 341 is entirely made of a synthetic resin. Note that, lens guide 341 may be made of a metal. Further, lens guide 341 may include a portion made of a synthetic resin and a portion made of a metal.

Lens guide 341 as such is arranged in second accommodation space 32*c*, in a state in which lens guide 341 is displaceable in the X direction (that is, a direction of the second optical axis) and in the Y direction. Lens guide 341 corresponds to an example of the movable-side member. Further, lens guide 341 may be understood to correspond to an example of a body of the movable-side member.

Lens holding part 341*a* includes an accommodation space capable of holding lens barrel 33A therein.

Each of the pair of first overhang parts 34*a*1 and 34*a*2 extends in directions opposite to each other in the Y-axis direction from two points on an outer peripheral surface of lens holding part 341*a* having a cylindrical shape.

Each of the pair of second overhang parts 34*a*3 and 34*a*4 extends in directions opposite to each other in the Y-axis direction from two points on the + side in the Z direction with respect to the pair of first overhang parts 34*a*1 and 34*a*2, on the outer peripheral surface of lens holding part 341*a* having a cylindrical shape.

First overhang part 34*a*1 that is one (on the + side in the Y direction) of the pair of first overhang parts 34*a*1 and 34*a*2 and second overhang part 34*a*3 that is one (on the + side in the Y direction) of the pair of second overhang parts 34*a*3 and 34*a*4 overlap each other via space 34*b*1 in the Z direction. First overhang part 34*a*2 that is the other (on the − side in the Y direction) of the pair of first overhang parts 34*a*1 and 34*a*2 and second overhang part 34*a*4 that is the other (on the − side in the Y direction) of the pair of second overhang parts 34*a*3 and 34*a*4 overlap each other via space 34*b*2 in the Z direction.

Lens guide 341 includes first magnet holding part 34*a*5 (see FIG. 13) that holds first AF magnet 346*a* of AF actuator 345 to be described later, and first magnet holding part 34*a*6 (see FIG. 13) that holds second AF magnet 347*a* of AF actuator 345 to be described later. Specifically, first magnet holding parts 34*a*5 and 34*a*6 are provided in the pair of first overhang parts 34*a*1 and 34*a*2, respectively.

Each of first magnet holding parts 34*a*5 and 34*a*6 has a rectangular frame shape that is open on the both sides in the Z direction. First magnet holding parts 34*a*5 and 34*a*6 as such are arranged on the − side in the Z direction of the pair of coil mount parts 32*i* and 32*j* (see FIGS. 22 and 23) of second base 32, respectively. Further, the pair of first magnet holding parts 34*a*5 and 34*a*6 and bottom through-holes 32*e* and 32*f* of second base 32 are provided on the same straight line parallel to the Z direction. The pair of first magnet holding parts 34*a*5 and 34*a*6 is provided on the + side in the Z direction with respect to bottom through-holes 32*e* and 32*f*.

Lens guide 341 includes second magnet holding part 34*a*7 (see FIG. 11) that holds first OIS magnet 352*a* of rear-side OIS actuator 351 to be described later. Further, lens guide 341 includes second magnet holding part 34*a*8 (see FIG. 12) that holds second OIS magnet 353*a* of rear-side OIS actuator 351. Specifically, second magnet holding parts 34*a*7 and 34*a*8 are provided in the pair of second overhang parts 34*a*3 and 34*a*4, respectively.

Each of the pair of second magnet holding parts 34*a*7 and 34*a*8 is a recess that is open on the − side in the Z direction. The pair of second magnet holding parts 34*a*7 and 34*a*8 as such and coil mount parts 32*i* and 32*j* of second base 32 are provided on the same straight line parallel to the Z direction. The pair of second magnet holding parts 34*a*7 and 34*a*8 is provided on the + side in the Z direction with respect to coil mount parts 32*i* and 32*j*.

Lens guide 341 includes third magnet holding part 34*b*3 (see FIG. 11) that holds first X-position detecting magnet 346*d* of AF actuator 345 in the vicinity of first magnet holding part 34*a*5. Further, lens guide 341 includes third magnet holding part 34*b*4 (see FIG. 12) that holds second X-position detecting magnet 347*d* of AF actuator 345 in the vicinity of first magnet holding part 34*a*6.

Specifically, each of third magnet holding parts 34*b*3 and 34*b*4 is provided, in the pair of first overhang parts 34*a*1 and 34*a*2, on the − side in the X direction with respect to first magnet holding parts 34*a*5 and 34*a*6. Note that, the positions of third magnet holding parts 34*b*3 and 34*b*4 are not limited to the positions described above as long as the positions of third magnet holding parts 34*b*3 and 34*b*4 are in the vicinity of first magnet holding parts 34*a*5 and 34*a*6.

Lens guide 341 includes fourth magnet holding part 34*b*5 (see FIG. 13) that holds first Y-position detecting magnet 352*c* of rear-side OIS actuator 351 in the vicinity of first magnet holding part 34*a*5. Further, Lens guide 341 includes fourth magnet holding part 34b6 (see FIG. 13) that holds second Y-position detecting magnet 353c of rear-side OIS actuator 351 in the vicinity of first magnet holding part 34a6.

Specifically, each of the pair of fourth magnet holding parts 34b5 and 34b6 is provided, in the pair of first overhang parts 34a1 and 34a2, on the + side in the X direction with respect to first magnet holding parts 34a5 and 34a6. Note that, the positions of the pair of fourth magnet holding part 34b5 and 34b6 are not limited to the position described above as long as the positions of the pair of fourth magnet holding part 34b5 and 34b6 are in the vicinity of first magnet holding parts 34a5 and 34a6.

When lens guide 341 is in a state of being displaced most on the + side in the X direction, an end surface on the + side in the X direction of lens guide 341 (hereinafter, the end surface will be referred to as "lens guide-side reference surface") abuts on first reference surface 32n1 of reference part 32n.

Each of the lens guide-side reference surface of lens guide 341 and first reference surface 32n1 is a flat surface parallel to the YZ plane. Accordingly, in a state in which the lens guide-side reference surface abuts (surface contact) on first reference surface 32n1, lens guide 341 becomes a state in which lens guide 341 is positioned along the X direction (that is, the direction of the second optical axis) and is not inclined in the Y direction and in the Z direction (hereinafter, the state will be referred to as "reference state of lens guide 341").

<Fixing Plate>

Figure 24A:
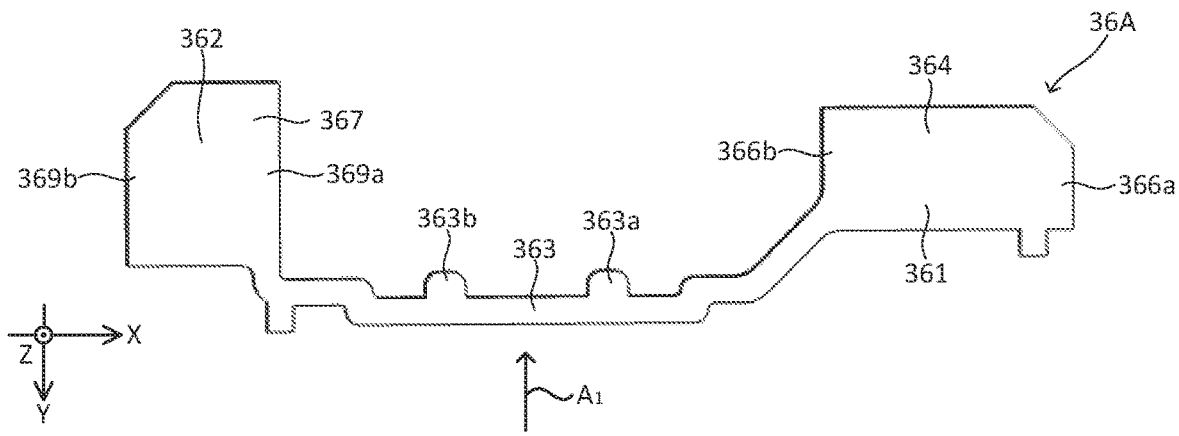
FIG. 24A is a plan view of a fixing plate.
Figure 24B:
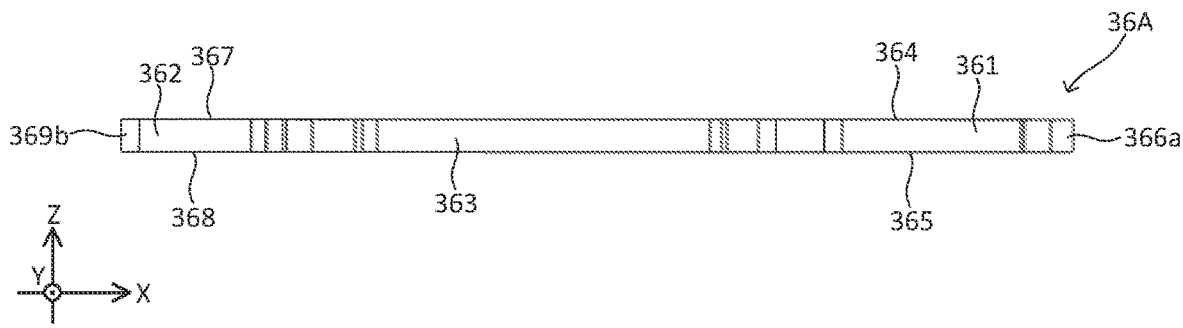
FIG. 24B illustrates the fixing plate viewed from a direction of arrow $A_1$ of FIG. 24A.
Figure 24C:
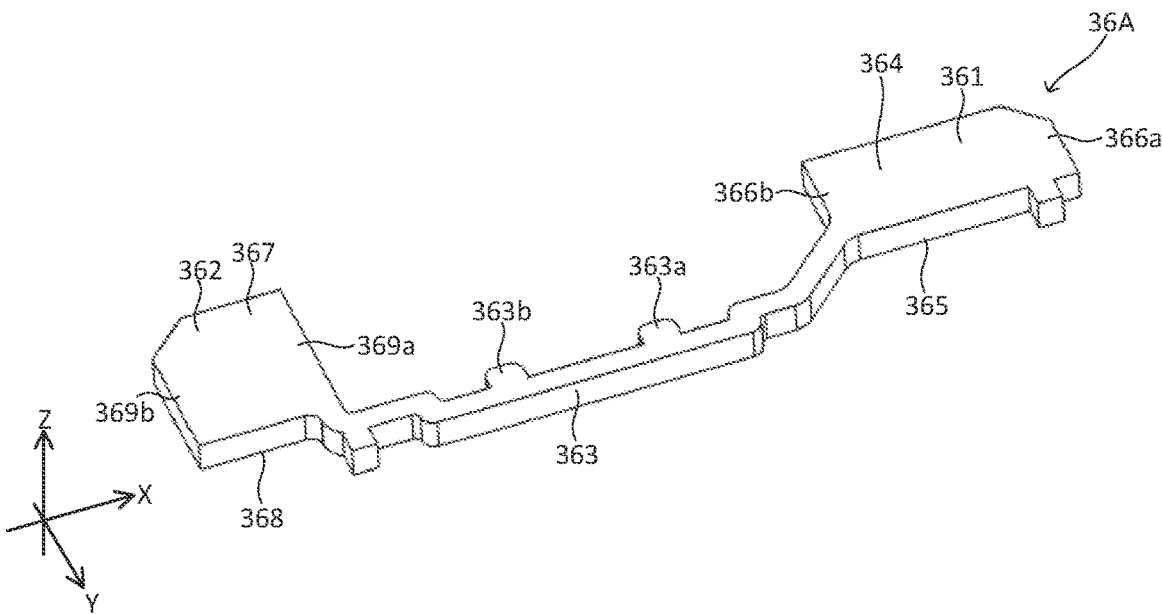
FIG. 24C is a perspective view of the fixing plate.
Figure 25A:
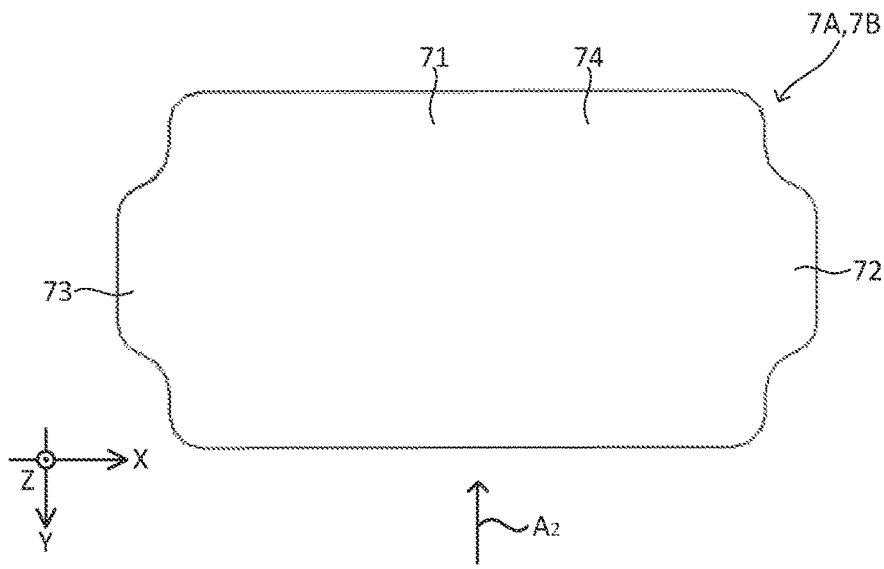
FIG. 25A is a plan view of a shield plate.
Figure 25B:
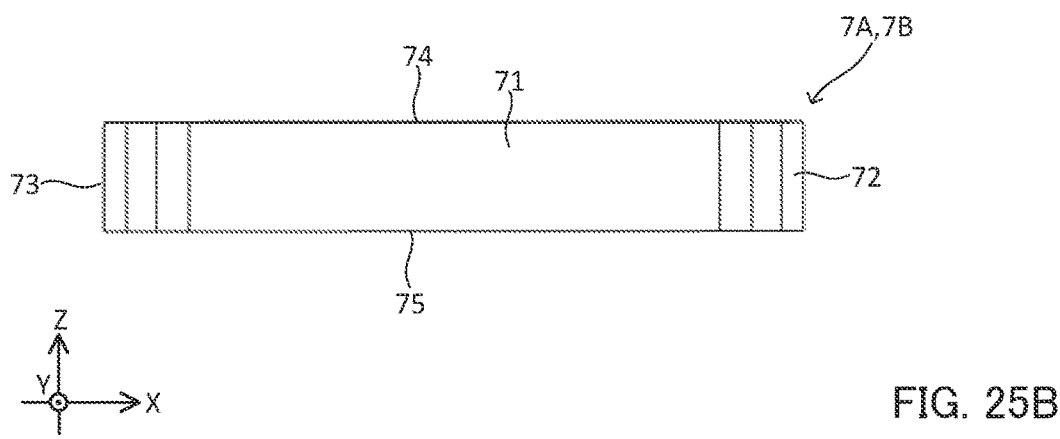
FIG. 25B illustrates the shield plate viewed from a direction of arrow $A_2$ of FIG. 25A.
Figure 25C:
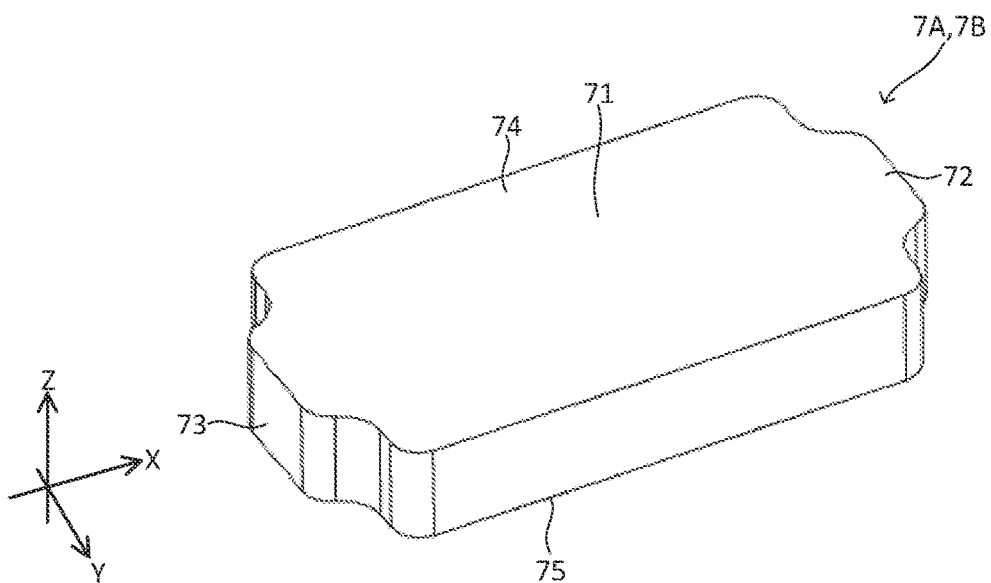
FIG. 25C is a perspective view of the shield plate.

Fixing plates 36A and 36B will be described with reference to FIGS. 11 to 13 and 24A to 24C. Note that, FIGS. 24A to 24C illustrate fixing plate 36A corresponding to the assembled state. In the assembled state, fixing plate 36B is symmetrical with fixing plate 36A illustrated in FIGS. 24A to 24C in the Y direction. Each of fixing plates 36A and 36B corresponds to an example of the magnet fixing part.

Fixing plate 36A is a member for fixing first X-position detecting magnet 346d arranged in third magnet holding part 34b3 and first Y-position detecting magnet 352c arranged in fourth magnet holding part 34b5 to lens guide 341. Fixing plates 36A and 36B may be understood to form a movable-side member together with lens guide 341.

As illustrated in FIGS. 24A to 24C, fixing plate 36A includes first fixed part 361, second fixed part 362, and connection part 363. Fixing plate 36A is entirely made of a non-magnetic metal.

First fixed part 361 has a plate shape parallel to the XY plane. First fixed part 361 includes first fixing surface 364 on the upper surface (a surface on the + side in the Z direction). Further, first fixed part 361 includes second fixing surface 365 on the lower surface (a surface on the – side in the Z direction). First fixed part 361 includes first locking part 366a and second locking part 366b.

First locking part 366a is provided in a first end part (an end part on the + side in the X direction) of first fixed part 361. Second locking part 366b is provided in a second end part (an end part on the – side in the X direction) of first fixed part 361. First locking part 366a and second locking part 366b correspond to examples of a locking part locked to lens guide 341.

First fixed part 361 is arranged above first Y-position detecting magnet 352c arranged in fourth magnet holding part 34b5.

Further, in a state in which first fixed part 361 is arranged with respect to lens guide 341 as described above, first locking part 366a and second locking part 366b engage with lens guide 341 in the Z direction. With such an engagement, movement of first fixed part 361 onto the – side in the Z direction with respect to lens guide 341 is regulated.

Further, first fixing surface 364 of first fixed part 361 is bonded to lens guide 341 with an adhesive. Specifically, first fixing surface 364 is bonded to a portion of lens guide 341, where the portion is provided above fourth magnet holding part 34b5, with an adhesive. As described above, with the bonding to and engagement with lens guide 341, first fixed part 361 is fixed to lens guide 341 in a state in which the movement of first fixed part 361 onto the – side in the Z direction is regulated.

Second fixing surface 365 of first fixed part 361 is bonded to the upper surface of first Y-position detecting magnet 352c with an adhesive. Second fixing surface 365 as such corresponds to an example of the attachment surface. In this manner, first fixed part 361 fixes first Y-position detecting magnet 352c to lens guide 341. Note that, in a case where fixing plate 36A is omitted, the attachment surface may be provided directly in lens guide 341.

Second fixed part 362 has a plate shape parallel to the XY plane. Second fixed part 362 includes third fixing surface 367 on the upper surface (a surface on the + side surface in the Z direction). Further, second fixed part 362 includes fourth fixing surface 368 on the lower surface (a surface on the – side in the Z direction). Second fixed part 362 includes third locking part 369a and fourth locking part 369b.

Third locking part 369a is provided in a first end part (an end part on the + side in the X direction) of second fixed part 362. Fourth locking part 369b is provided in a second end part (a surface on the – side in the X direction) of second fixed part 362. Third locking part 369a and fourth locking part 369b correspond to examples of the locking part locked to lens guide 341.

Second fixed part 362 is arranged above first X-position detecting magnet 346d arranged in third magnet holding part 34b3.

Further, in a state in which second fixed part 362 is arranged with respect to lens guide 341 as described above, third locking part 369a and fourth locking part 369b engage with lens guide 341 in the Z direction. With such an engagement, movement of second fixed part 362 onto the – side in the Z direction with respect to lens guide 341 is regulated.

Further, third fixing surface 367 of second fixed part 362 is bonded to lens guide 341 with an adhesive. Specifically, third fixing surface 367 is bonded to a portion of lens guide 341, where the portion is provided above third magnet holding part 34b3, with an adhesive. As described above, with the bonding to and engagement with lens guide 341, second fixed part 362 is fixed to lens guide 341 in a state in which the movement of second fixed part 362 onto the – side in the Z direction is regulated.

Fourth fixing surface 368 of second fixed part 362 is bonded to the upper surface of first X-position detecting magnet 346d with an adhesive. Fourth fixing surface 368 as such corresponds to an example of the attachment surface. In this manner, second fixed part 362 fixes first X-position detecting magnet 346d to lens guide 341.

Connection part 363 connects first fixed part 361 and second fixed part 362. Specifically, connection part 363 connects first fixed part 361 and second fixed part 362 in the X direction. Connection part 363 may be omitted.

In the case of the present embodiment, connection part 363 includes positioning protrusions 363a and 363b. Each of positioning protrusions 363a and 363b is provided on a first side surface (an inner side surface in the Y direction) of connection part 363. In the assembled state, the first side surface is a surface facing outer side surface 76 (see FIG. 16) of shield plate 7A to be described later in the Y direction.

On the first side surface of connection part 363, positioning protrusions 363*a* and 363*b* are provided at two points apart from each other in the X direction. Positioning protrusions 363*a* and 363*b* as such protrude from the first side surface of connection part 363 toward outer side surface 76 of shield plate 7A.

When fixing plate 36A is assembled to lens guide 341, positioning protrusions 363*a* and 363*b* abut on outer side surface 76 of shield plate 7A to guide the assembly of fixing plate 36A. Positioning protrusions 363*a* and 363*b* as such contribute to an enhanced efficiency of work of assembling fixing plate 36A. Note that, in the assembled state, positioning protrusions 363*a* and 363*b* are separated from outer side surface 76 of shield plate 7A. In other words, in the assembled state, a gap in the Y direction is present between positioning protrusions 363*a* and 363*b* and outer side surface 76 of shield plate 7A.

Note that, in fixing plate 36A, a surface (second fixing surface 365) bonded to first Y-position detecting magnet 352*c* and a surface (fourth fixing surface 368) bonded to first X-position detecting magnet 346*d* may be made of a metal, and the other portion may be made of a non-metal (for example, made of a synthetic resin).

Fixing plate 36B is a member for fixing second X-position detecting magnet 347*d* arranged in third magnet holding part 34*b*4 and second Y-position detecting magnet 353*c* arranged in fourth magnet holding part 34*b*6 to lens guide 341. Fixing plate 36B may be understood to form a movable-side member together with lens guide 341.

In the same manner as fixing plate 36A, fixing plate 36B includes first fixed part 361, second fixed part 362, and connection part 363. Fixing plate 36B is entirely made of a non-magnetic metal. Since the structure of fixing plate 36B as such is the same as the structure of fixing plate 36A, a description of the structure of fixing plate 36B will be omitted.

First fixed part 361 of fixing plate 36B is arranged above second Y-position detecting magnet 353*c* arranged in fourth magnet holding part 34*b*6. First fixed part 361 of fixing plate 36B fixes second Y-position detecting magnet 353*c* to lens guide 341.

Second fixed part 362 of fixing plate 36B is arranged above second X-position detecting magnet 347*d* arranged in third magnet holding part 34*b*4. Second fixed part 362 of fixing plate 36B fixes second X-position detecting magnet 347*d* to lens guide 341.

<First Support Mechanism>

First support mechanism 342 will be described with reference to FIGS. 10A to 12 and 15. First support mechanism 342 elastically supports lens guide 341 on second base 32 in a state in which lens guide 341 is displaceable with respect to second base 32.

First support mechanism 342 includes a plurality (four in the case of the present embodiment) of springs 3421 to 3424. Springs 3421 to 3424 elastically support lens guide 341 on second base 32. In this state, lens part 33 can be displaced in the X direction and the Y direction with respect to second base 32.

Further, first support mechanism 342 regulates displacement of lens guide 341 in the Z direction with respect to second base 32 to a prescribed range. The prescribed range is a range in which lens guide 341 is displaceable based on elastic deformation of springs 3421 to 3424.

Figure 10A:
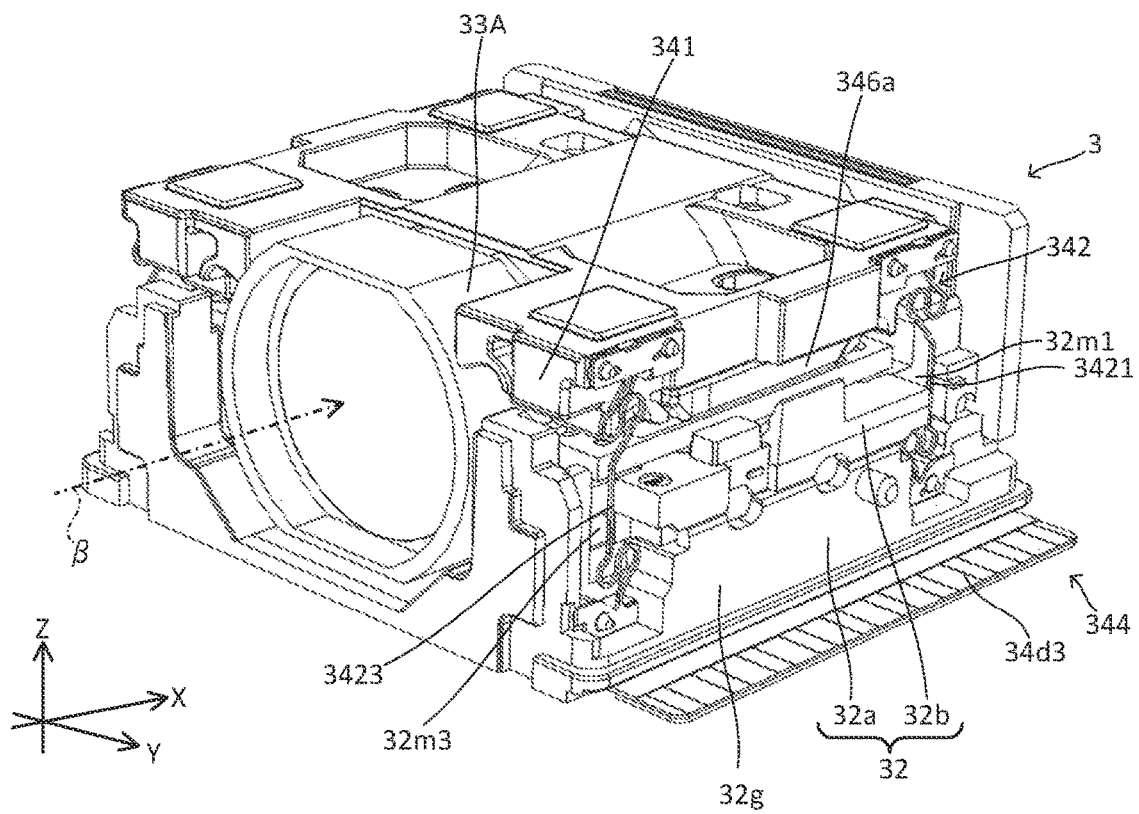
FIG. 10A is a perspective view of the lens module from which some members are omitted.

Spring 3421 supports an end part on the + side in the X direction and on the + side in the Y direction of lens guide 341 on second base 32 (see FIG. 10A). Spring 3422 supports an end part on the + side in the X direction and on the − side in the Y direction of lens guide 341 on second base 32 (see FIG. 10B).

Spring 3423 supports an end part on the − side in the X direction and on the + side in the Y direction of lens guide 341 on second base 32 (see FIG. 10A). Furthermore, spring 3424 supports an end part on the − side in the X direction and on the − side in the Y direction of lens guide 341 on second base 32 (see FIG. 10B).

Figure 15:
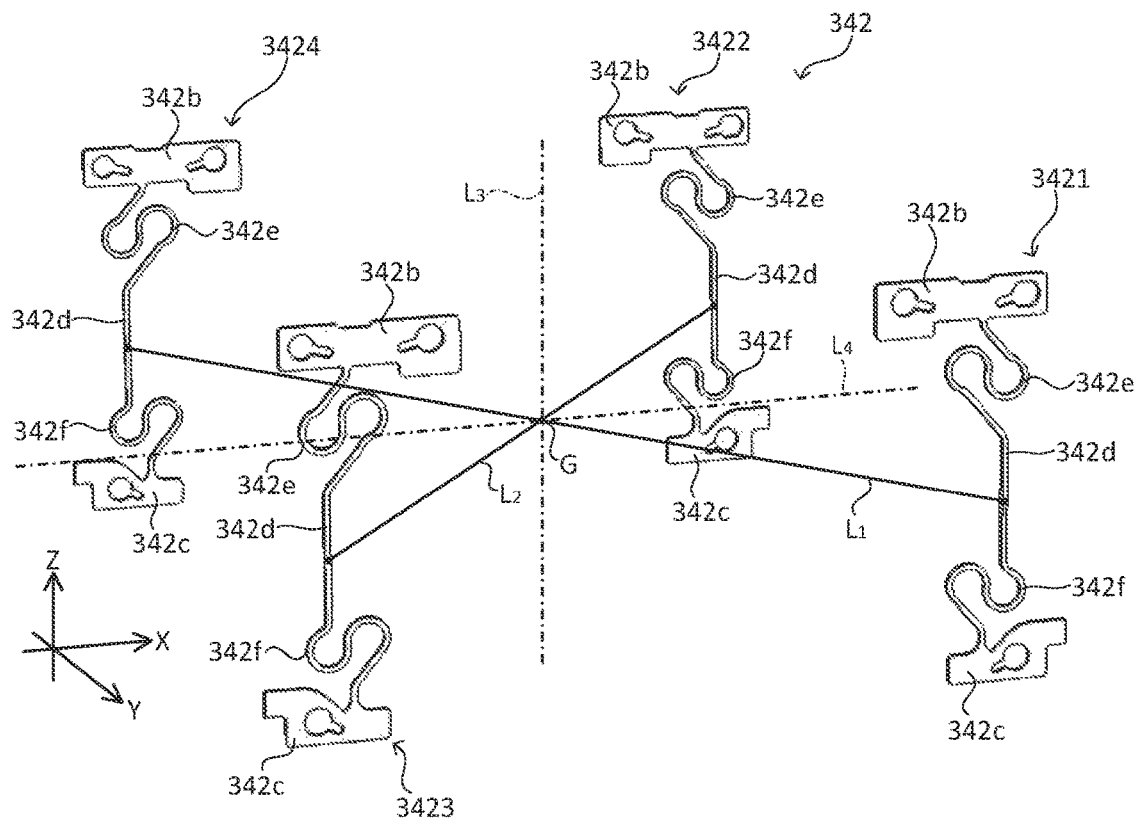
FIG. 15 is a perspective view of only springs as being arranged in an assembled state.
Figure 16:
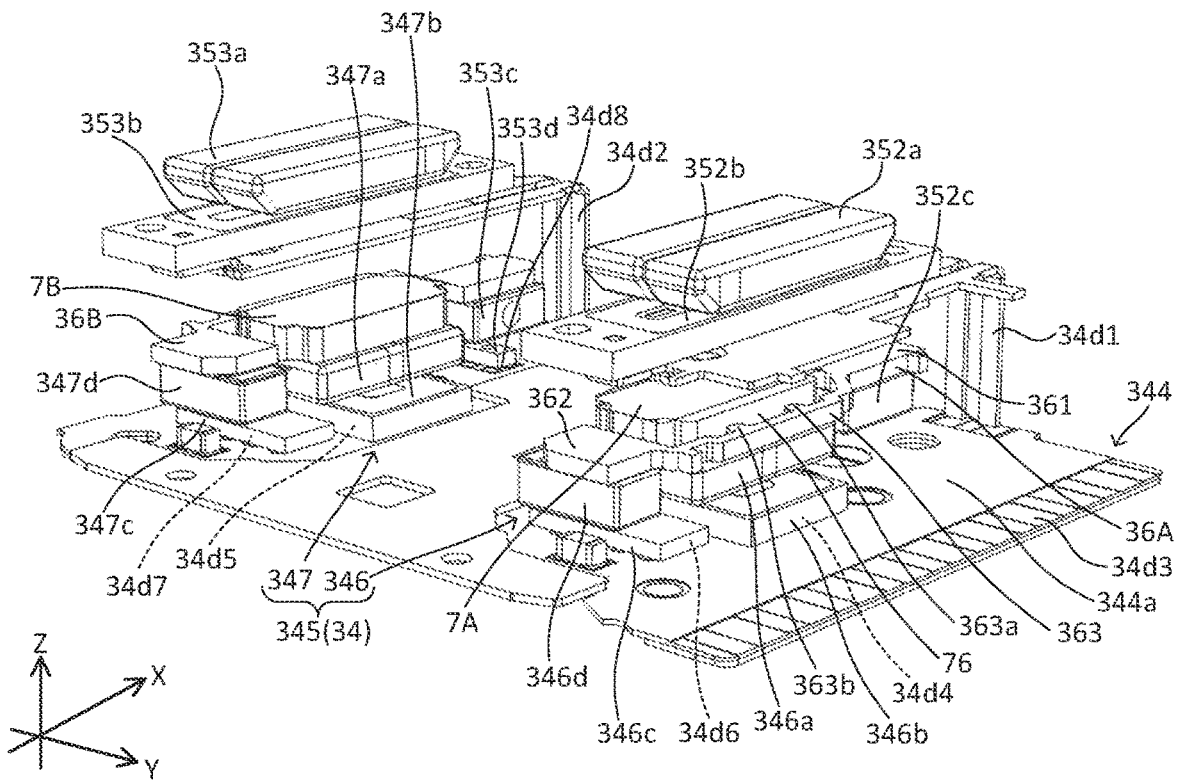
FIG. 16 is a perspective view of an FPC, an AF actuator, and a rear-side OIS actuator.

As illustrated in FIG. 15, each of springs 3421 to 3424 includes first fixed part 342*b*, second fixed part 342*c*, and connection part 342*d*. Note that, FIG. 15 illustrates springs 3421 to 3424 as arranged in the assembled state.

First fixed part 342*b* is fixed to lens guide 341 that is a movable-side member. Second fixed part 342*c* is fixed to second base 32 that is a fixed-side member.

Connection part 342*d* connects first fixed part 342*b* and second fixed part 342*c*. Connection part 342*d* is composed of, for example, a linear member that is at least partially curved (specifically, bent into a meandering shape and molded).

Specifically, each connection part 342*d* includes first bending part 342*e* and second bending part 342*f* in this order from the + side in the Z direction. Each of springs 3421 to 3424 as such is arranged in spring arrangement parts 32*m*1 to 32*m*4 (see FIGS. 10A and 10B) of second base 32.

First bending part 342*e* is a portion bent in a meandering shape, and is provided in one end part (an end part on the + side in the Z direction) of connection part 342*d*. First bending part 342*e* as such elastically deforms in the length direction (the Z direction) of connection part 342*d* when lens part 33 is displaced in the Z direction with respect to second base 32.

Note that, the position of first bending part 342*e* is not limited to the position of the present embodiment. First bending part 342*e* is preferably provided in a half part on one side (that is, a half part on a side of first fixed part 342*b*) of connection part 342*d*. Further, first bending part 342*e* is more preferably provided in one end part of connection part 342*d* as in the present embodiment. Although illustration is omitted, each first bending part 342*e* may be covered with a gel-like damping member in the assembled state.

Second bending part 342*f* is a linear member that is provided in the other end part (an end part on the − side in the Z direction) of connection part 342*d* and is bent in a meandering shape. Second bending part 342*f* elastically deforms in the length direction (the Z direction) of connection part 342*d* when lens part 33 is displaced in the Z direction with respect to second base 32. The amount of displacement of second bending part 342*f* when lens part 33 is displaced in the Z direction with respect to second base 32 is smaller than the amount of displacement of first bending part 342*e*.

Further, when lens part 33 is displaced in the X direction with respect to second base 32, connection part 342*d* is displaced so as to swing, with the vicinity of an end part on a side of second fixed part 342*c* being as a fulcrum. Accordingly, the farther a portion of connection part 342*d* is from the fulcrum (in other words, the closer a portion of connection part 342*d* is to first fixed part 342*b*), the greater the amount of displacement is when lens part 33 is displaced in the X direction with respect to second base 32.

Note that, the position of second bending part 342*f* is not limited to the position of the present embodiment. Second bending part 342*f* is preferably provided in a half part on the other side (that is, a half part on the side of second fixed part 342c) of connection part 342d. Further, second bending part 342f is more preferably provided in the other end part of connection part 342d as in the present embodiment. Further, in the present embodiment, second bending part 342f may be omitted. That is, connection part 342d may be configured to include a bending part at only one point. Note that, although illustration is omitted, each second bending part 342f may be covered with a gel-like damping member.

In the case of the present embodiment, connection part 342d has directionality in the X direction. Springs 3421 and 3422 are arranged so as to be in the same direction in the X direction. In other words, springs 3421 and 3422 are arranged such that at least connection parts 342d overlap each other when viewed from the + side in the Y direction, for example.

Springs 3423 and 3424 are arranged so as to be in the same direction in the X direction. In other words, springs 3423 and 3424 are arranged such that at least connection parts 342d overlap each other when viewed from the + side in the Y direction, for example.

Springs 3421 and 3422 are arranged such that connection parts 342d face in the same direction in the X direction. Springs 3423 and 3424 are arranged such that connection parts 342d face in the same direction in the X direction. However, as a modification, connection parts 342d of springs 3421 and 3422 may have a line symmetrical relationship using the Z axis as a symmetry axis, when viewed from the Y direction. Further, connection parts 342d of springs 3423 and 3424 may also have a line symmetrical relationship using the Z axis as a symmetry axis, when viewed from the Y direction. Even in the case of such a modification, springs 3421 and 3423 are preferably arranged so as to be in the same direction in the X direction, and springs 3422 and 3424 are preferably arranged so as to be in the same direction in the X direction.

Further, in the case of the present embodiment, when a straight line connecting the centers of springs 3421 and 3424 arranged at diagonal positions of lens guide 341 is straight line $L_1$ and a straight line connecting the centers of springs 3422 and 3423 is straight line $L_2$ when viewed from the + side in the Z direction as illustrated in FIG. 15, for example, the intersection of straight lines $L_1$ and $L_2$ (also referred to as center position of dispersed arrangement) coincides or substantially coincides with center of gravity G of the movable-side member at a reference position to be described later.

The center of each of springs 3421 to 3424 is, for example, the center position in the Z direction and the center position in the X direction of each of springs 3421 to 3424. Further, the reference position of lens guide 341 refers to a state in which lens guide 341 is not displaced in the X direction by the autofocusing function and a state in which lens guide 341 is not displaced in the Y direction by second shake correction apparatus 35 to be described later. Such a configuration reduces resonance of lens guide 341 around straight line $L_3$ passing through center of gravity G of the movable-side member and parallel to the Z direction.

Note that, each of springs 3421 to 3424 as described above is arranged in the following manner. When a straight line passing through center of gravity G described above and parallel to the direction of the second optical axis (that is, the X direction) is straight line $L_4$ (see FIG. 15), a pair of springs 3421 and 3422 on the + side in the X direction is arranged at two points symmetrical with respect to straight line $L_4$ described above and separated from center of gravity G by prescribed distances on the + side in the X direction (the right side in FIG. 15). On the other hand, a pair of springs 3423 and 3424 on the − side in the X direction is arranged at two points symmetrical with respect to straight line $L_4$ described above and separated from center of gravity G by the prescribed distances described above on the − side in the X direction (the left side in FIG. 15). As a result, the intersection of straight line $L_1$ described above and straight line $L_2$ described above coincides with center of gravity G described above.

[FPC]

FPC 344 will be described with reference to FIGS. 16 to 18, 22 and 23. FPC 344 is a flexible printed circuit board and is fixed to second base 32 (see FIGS. 10A and 10B).

FPC 344 includes FPC base 344a, first terminal part 34d1, second terminal part 34d2, third terminal part 34d3, first coil fixed part 34d4, second coil fixed part 34d5, first controller fixed part 34d6, second controller fixed part 34d7, Hall element fixed part 34d8, and AF driving control circuit 344b (see FIG. 18).

Figure 10B:
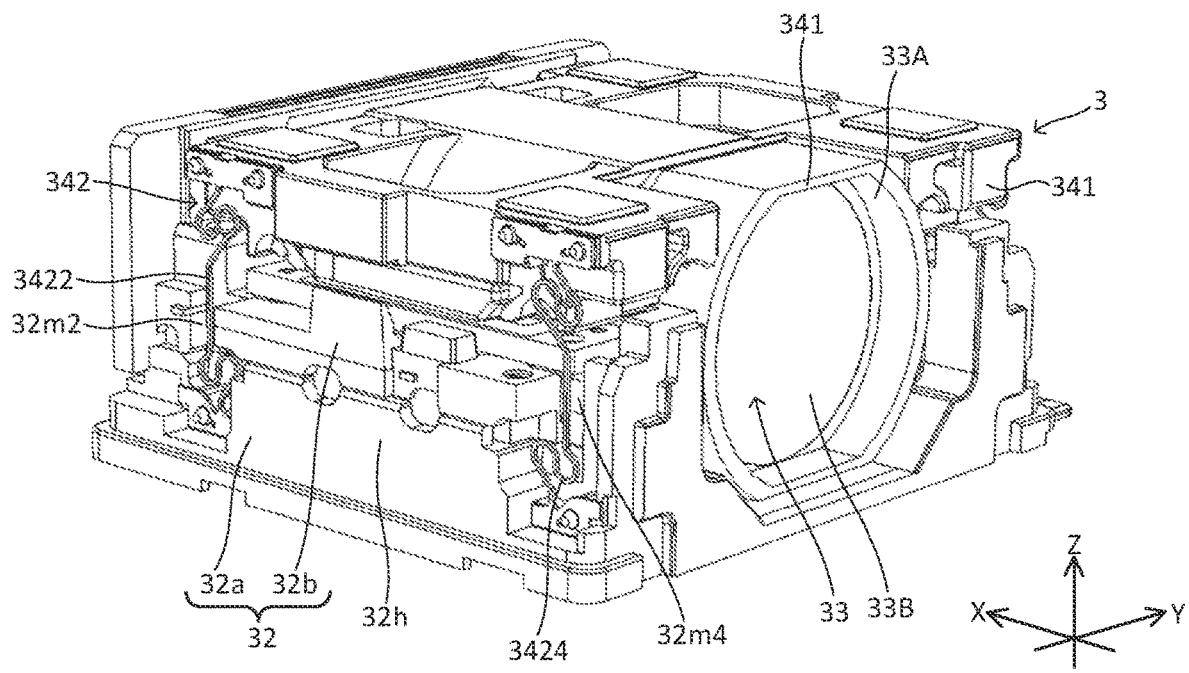
FIG. 10B is a perspective view of the lens module from which some members are omitted, in a state in which the lens module is viewed from an angle different from that in FIG. 10A.

FPC base 344a is a plate-like member parallel to the XY plane, and is fixed to second base 32 (see FIGS. 10A and 10B).

Each of first terminal part 34d1 and second terminal part 34d2 extends on the + side in the Z direction from two points apart from each other in the Y direction in an end part on the + side in the X direction of FPC base 344a. First terminal part 34d1 is electrically connected to first OIS coil 352b. Second terminal part 34d2, on the other hand, is electrically connected to second OIS coil 353b.

Third terminal part 34d3 is connected to sensor board 6 (FIG. 18) on which imaging element module 4 is mounted. As illustrated in FIG. 18, third terminal part 34d3 includes power supply terminal T1, grounding terminal T2, data signal terminal T3, first clock terminal T4, and second clock terminal T5. Each terminal of third terminal part 34d3 as such, in a state in which FPC 344 is connected to sensor board 6, is connected to each corresponding terminal in board-side circuit 6a of sensor board 6.

On a surface on the + side in the Z direction of FPC base 344a, first coil fixed part 34d4 and second coil fixed part 34d5 are provided at positions facing first magnet holding parts 34a5 and 34a6 of lens guide 341, respectively, in the Z direction. Specifically, on the surface on the + side in the Z direction of FPC base 344a, first coil fixed part 34d4 and second coil fixed part 34d5 are provided apart from each other on one side (the + side in the Y direction) in the Y direction and on the other side (the − side in the Y direction) in the Y direction about the second optical axis.

First AF coil 346b and second AF coil 347b are fixed to first coil fixed part 34d4 and second coil fixed part 34d5 as such, respectively. First coil fixed part 34d4 and second coil fixed part 34d5 are arranged in bottom through-holes 32e and 32f (see FIGS. 19 and 20) of second base 32, respectively.

On the surface on the + side in the Z direction of FPC base 344a, first controller fixed part 34d6 and second controller fixed part 34d7 are provided in the vicinity of first coil fixed part 34d4 and second coil fixed part 34d5, respectively. Specifically, on the + side in the Z direction surface of FPC base 344a, first controller fixed part 34d6 and second controller fixed part 34d7 are provided in the vicinity on the − side in the X direction with respect to first coil fixed part 34d4 and second coil fixed part 34d5, respectively.

First AF controller 346c and second AF controller 347c are fixed to first controller fixed part 34d6 and second controller fixed part 34d7 as such, respectively.

On the surface on the + side in the Z direction of FPC base 344a, Hall element fixed part 34d8 is provided at a position where Hall element fixed part 34*d*8 and fourth magnet holding part 34*b*6 (see FIG. 12) of lens guide 341 face each other in the Z direction. OIS Hall element 353*d* of rear-side OIS actuator 351 to be described later is fixed to Hall element fixed part 34*d*8.

As illustrated in FIG. 18, AF driving control circuit 344*b* includes first power supply line L1, second power supply line L2, first grounding line L3, second grounding line L4, first data signal line L5, second data signal line L6, first clock line L7, second clock line L8, first coil power supply lines L9 and L10, and second coil power supply lines L11 and L12.

First power supply line L1 is a transmission line for current supplied from control section 5 mounted on sensor board 6 to first AF controller 346*c*. One end of first power supply line L1 is connected to power supply terminal T1 of third terminal part 34*d*3. The other end of first power supply line L1 is connected to an input-side power supply terminal (not illustrated) of first AF controller 346*c*.

Second power supply line L2 is a transmission line for current supplied from control section 5 mounted on sensor board 6 to second AF controller 347*c*. One end of second power supply line L2 is connected to power supply terminal T1 of third terminal part 34*d*3. The other end of second power supply line L2 is connected to an input-side power supply terminal (not illustrated) of second AF controller 347*c*. As described above, first power supply line L1 and second power supply line L2 are branched in the middle.

First grounding line L3 is a transmission line for grounding. One end of first grounding line L3 is connected to grounding terminal T2 of third terminal part 34*d*3. The other end of first grounding line L3 is connected to a grounding terminal (not illustrated) of first AF controller 346*c*.

Second grounding line L4 is a transmission line for grounding. One end of second grounding line L4 is connected to grounding terminal T2 of third terminal part 34*d*3. The other end of second grounding line L4 is connected to a grounding terminal (not illustrated) of second AF controller 347*c*. First grounding line L3 and second grounding line L4 are branched in the middle.

First data signal line L5 is a transmission line for a control signal between control section 5 and first AF controller 346*c*. One end of first data signal line L5 is connected to data signal terminal T3 of third terminal part 34*d*3. The other end of first data signal line L5 is connected to an input-side data signal terminal (not illustrated) of first AF controller 346*c*.

Second data signal line L6 is a transmission line for a control signal between control section 5 and second AF controller 347*c*. One end of second data signal line L6 is connected to data signal terminal T3 of third terminal part 34*d*3. The other end of second data signal line L6 is connected to an input-side data signal terminal (not illustrated) of second AF controller 347*c*. First data signal line L5 and second data signal line L6 are branched in the middle.

First clock line L7 is a transmission line for a clock signal between control section 5 and first AF controller 346*c*. One end of first clock line L7 is connected to first clock terminal T4 of third terminal part 34*d*3. The other end of first clock line L7 is connected to a clock terminal (not illustrated) of first AF controller 346*c*.

Second clock line L8 is a transmission line for a clock signal between control section 5 and second AF controller 347*c*. One end of second clock line L8 is connected to second clock terminal T5 of third terminal part 34*d*3. The other end of second clock line L8 is connected to a clock terminal (not illustrated) of second AF controller 347*c*.

First coil power supply lines L9 and L10 are transmission lines that connect first AF controller 346*c* and first AF coil 346*b*.

One end of first coil power supply line L9 is connected to a first terminal (not illustrated) of an output-side power supply terminal of first AF controller 346*c*. The other end of first coil power supply line L9 is connected to one end of first AF coil 346*b*.

One end of first coil power supply line L10 is connected to a second terminal (not illustrated) of the output-side power supply terminal of first AF controller 346*c*. The other end of first coil power supply line L10 is connected to the other end of first AF coil 346*b*.

Second coil power supply lines L11 and L12 are transmission lines that connect second AF controller 347*c* and second AF coil 347*b*.

One end of second coil power supply line L11 is connected to a first terminal (not illustrated) of an output-side power supply terminal of second AF controller 347*c*. The other end of second coil power supply line L11 is connected to one end of second AF coil 347*b*.

One end of second coil power supply line L12 is connected to a second terminal (not illustrated) of the output-side power supply terminal of second AF controller 347*c*. The other end of second coil power supply line L12 is connected to the other end of second AF coil 347*b*.

AF driving control circuit 344*b* as described above is connected to sensor board 6 via third terminal part 34*d*3. With this, first AF controller 346*c* and second AF controller 347*c* are connected to control section 5 mounted on sensor board 6.

<AF Actuator>

Figure 17:
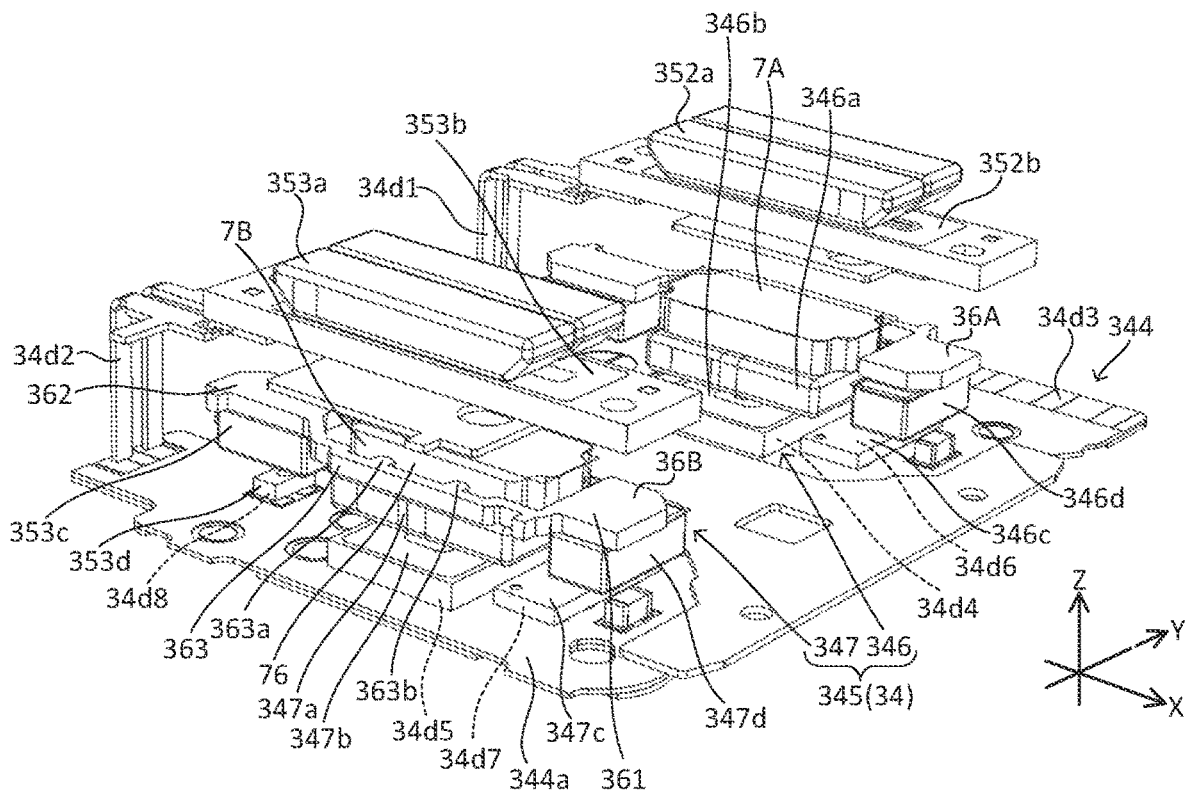
FIG. 17 is a perspective view of the FPC, the AF actuator, and the rear-side OIS actuator viewed from an angle different from that in FIG. 16.

AF actuator 345 will be described with reference to FIGS. 11, 12 and 17. AF actuator 345 displaces lens guide 341 in the X direction (the direction of the second optical axis) during autofocusing. AF actuator 345 corresponds to an example of a driving mechanism.

AF actuator 345 includes first AF actuator 346 arranged on the + side in the Y direction and second AF actuator 347 arranged on the − side in the Y direction.

First AF actuator 346 includes first AF magnet 346*a*, first AF coil 346*b*, first X-position detecting magnet 346*d*, and first AF controller 346*c*.

Second AF actuator 347 includes second AF magnet 347*a*, second AF coil 347*b*, second X-position detecting magnet 347*d*, and second AF controller 347*c*.

First AF actuator 346 and second AF actuator 347 as such are moving magnet-type actuators in which first AF magnet 346*a* and second AF magnet 347*a* are fixed to lens guide 341, and first AF coil 346*b* and second AF coil 347*b* are fixed to second base 32.

Note that, first AF actuator 346 and second AF actuator 347 may be moving coil-type actuators. Hereinafter, arrangement of respective components of AF actuator 345 will be described.

First AF magnet 346*a* and second AF magnet 347*a* are arranged in first magnet holding parts 34*a*5 and 34*a*6 of lens guide 341, respectively. First AF magnet 346*a* is fixed to lens guide 341 via shield plate 7A to be described later. Further, second AF magnet 347*a* is fixed to lens guide 341 via shield plate 7B to be described later.

In this state, first AF magnet 346*a* and second AF magnet 347*a* are arranged on the + side in the Z direction of the pair of coil mount parts 32*i* and 32*j* (see FIGS. 10A and 10B) of second base 32, respectively. In the case of the present embodiment, each of first AF magnet 346*a* and second AF magnet 347*a* is composed of two magnet elements (reference sign is omitted) arranged so as to be adjacent to each other in the Y direction. These respective magnet elements are magnetized in the Z direction and are arranged such that the directions of the magnetic poles of the respective magnet elements are opposite to each other.

Further, each of first AF magnet 346a and second AF magnet 347a is a cuboid which is long in the X direction and whose shape, viewed from the Y direction (the state illustrated in FIGS. 11 and 12), for example, is substantially rectangular.

Each of first AF coil 346a and second AF coil 347b is a so-called air-core coil having an oval shape, to which power is supplied during autofocusing. First AF coil 346a and second AF coil 347b are fixed, in a state in which the major axes coincide with the Y direction, to first coil fixed part 34d4 and second coil fixed part 34d5 of FPC 344, respectively, via a board (not illustrated).

As illustrated in FIG. 18, first AF coil 346b is connected to first AF controller 346c via first coil power supply lines L9 and L10. The current value of first AF coil 346b is controlled by first AF controller 346c.

Each of first X-position detecting magnet 346d and second X-position detecting magnet 347d corresponds to an example of the magnet part, and is a cuboid which is magnetized in the Z direction and whose shape, viewed from the Y direction (the state illustrated in FIGS. 11 and 12), for example, is substantially rectangular. First X-position detecting magnet 346d and second X-position detecting magnet 347d as such are held by a pair of third magnet holding portions 34b3 and 34b4 of lens guide 341, respectively. Each of first X-position detecting magnet 346d and second X-position detecting magnet 347d corresponds to an example of the position detecting magnet.

As described above, first X-position detecting magnet 346d is fixed to lens guide 341 via the first fixed part of fixing plate 36A. Further, second X-position detecting magnet 347d is fixed to lens guide 341 via the first fixed part of fixing plate 36B.

First AF controller 346c is fixed to first controller fixed part 34d6 of FPC 344. First AF controller 346c as such includes first detection part 346e and first driving control section 346f as illustrated in FIG. 18.

First detection part 346e detects magnetic flux (also referred to as positional information) between first AF magnet 346a and first X-position detecting magnet 346d. First detection part 346e transmits a detected value to first driving control section 346f.

First driving control section 346f determines the position of first AF magnet 346a in the X direction (the position will also be referred to as first position) based on a detected value received from first detection part 346e. Further, first driving control section 346f controls the current value of first AF coil 346b based on a detected value received from first detection part 346e. Note that, first AF controller 346c does not control the current value of second AF coil 347b.

As described above, in first AF actuator 346, closed loop control is performed based on a detected value by first detection part 346e. Note that, first driving control section 346f may be omitted. In this case, processing performed by first driving control section 346f may be performed by, for example, control section 5 mounted on sensor board 6.

Further, second AF controller 347c is fixed to second controller fixed part 34d7 of FPC 344. As illustrated in FIG. 18, second AF controller 347c as such includes second detection part 347e and second driving control section 347f.

Second detection part 347e detects magnetic flux (also referred to as positional information) between second AF magnet 347a and second X-position detecting magnet 347d. Second detection part 347e transmits a detected value to second driving control section 347f.

Second driving control section 347f determines the position of second AF magnet 347a in the X direction (the position will also be referred to as second position) based on a detected value (positional information) received from second detection part 347e. Further, second driving control section 347f controls the current value of second AF coil 347b based on a detected value received from second detection part 347e. Note that, second AF controller 347c does not control the current value of first AF coil 346b.

As described above, in second AF actuator 347, closed loop control is performed based on a detected value by second AF controller 347c. Note that, second driving control section 347f may be omitted. In this case, processing performed by second driving control section 347f may be performed by, for example, control section 5 mounted on sensor board 6.

In the case of first AF actuator 346 and second AF actuator 347 having the configurations as described above, when current flows through first AF coil 346a and second AF coil 347b under the control by first AF controller 346c and second AF controller 347c, a Lorentz force (thrust) that displaces first AF magnet 346a and second AF magnet 347a in the X direction is generated.

The direction of such thrust changes by controlling the direction of current flowing through first AF coil 346b and second AF coil 347b. Thus, the direction of displacement of lens guide 341 can be changed.

In the configuration of the present embodiment, thrust generated by first AF actuator 346 and thrust generated by second AF actuator 347 can be caused to differ from each other by independently controlling the current value of first AF coil 346b of first AF actuator 346 and the current value of second AF coil 347b of second AF actuator 347.

Specifically, in a case where thrust generated by first AF actuator 346 and thrust generated by second AF actuator 347 are the same, thrust generated by AF actuator 345 is composed only of first thrust in the X direction. On the other hand, in a case where thrust generated by first AF actuator 346 and thrust generated by second AF actuator 347 differ from each other, thrust generated by AF actuator 345 includes the first thrust in the X direction and second thrust that is a moment around center of gravity G of the movable-side member.

The second thrust as such serves as a resistance force that resists an external force to cause lens guide 341 to deviate from the X direction during autofocusing. Thus, the amount of deviation of lens guide 341 from the X direction can be reduced or be set to zero by AF actuator 345 during autofocusing. Note that, the external force described above will be described later.

Further, in the case of the present embodiment, AF actuator 345 is also a second driving mechanism part that generates a resistance force that resists an external force acting to cause the movable-side member (lens guide 341) to deviate from the Y direction when second shake correction apparatus 35 to be described later performs shake correction.

That is, AF actuator 345 detects the positions of first AF magnet 346a and second AF magnet 347a in the X direction by first AF controller 346c and second AF controller 347c when second shake correction apparatus 35 to be described later performs shake correction.

Further, first AF controller 346c and second AF controller 347c control the current values of first AF coil 346b and second AF coil 347b, respectively, based on detected values.

Thus, when second shake correction apparatus 35 performs shake correction, AF actuator 345 generates a resistance force against an external force to cause lens guide 341 to deviate from the Y direction. As a result, the amount of deviation of lens guide 341 from the Y direction can be reduced or be set to zero by AF actuator 345 during shake correction.

<Second Shake Correction Apparatus>

Second shake correction apparatus 35 will be described with reference to FIGS. 11, 12 and 17. Second shake correction apparatus 35 is a driving section and performs shake correction in the Y direction by displacing lens part 33 in the Y direction. Shake correction apparatus 35 as such is arranged in second accommodation space 32c (see FIG. 1) described above.

Second shake correction apparatus 35 includes lens guide 341 described above, the plurality of springs 3421 to 3424 described above, FPC 344 described above, and rear-side OIS actuator 351.

Lens guide 341, springs 3421 to 3424, and FPC 344 are common to those in AF apparatus 34.

Rear-side OIS actuator 351 includes first OIS actuator 352 arranged on the + side in the Y direction and second OIS actuator 353 arranged on the − side in the Y direction.

As illustrated in FIG. 11, first OIS actuator 352 is arranged in a state of overlapping first AF actuator 346 with a prescribed distance gap therebetween in the Z direction. First OIS actuator 352 as such includes first OIS magnet 352a, first OIS coil 352b, and first Y-position detecting magnet 352c.

As illustrated in FIG. 12, second OIS actuator 353 is arranged in a state of overlapping second AF actuator 347 with a prescribed distance gap therebetween in the Z direction. Second OIS actuator 353 as such includes second OIS magnet 353a, second OIS coil 353b, second Y-position detecting magnet 353c, and OIS Hall element 353d.

By arranging first OIS actuator 352 and second OIS actuator 353 and first AF actuator 346 and second AF actuator 347 as described above, the center of the driving force of rear-side OIS actuator 351 coincides with or is close to the center of the driving force of AF actuator 345. This configuration makes it difficult for lens guide 341 to be tilt-displaced (that is, swinging displacement about an axis parallel to the Y direction or the Z direction) during auto-focusing and shake correction.

Rear-side OIS actuator 351 as described above is a moving magnet-type actuator in which first OIS magnet 352a and second OIS magnet 353a are fixed to lens guide 341, and first OIS coil 352b and second OIS coil 353b are fixed to second base 32. Rear-side OIS actuator 351 may be, however, a moving coil-type actuator.

First OIS magnet 352a and second OIS magnet 353a are held by second magnet holding parts 34a7 and 34a8 of lens guide 341, respectively.

In the case of the present embodiment, each of first OIS magnet 352a and second OIS magnet 353a is composed of two magnet elements (reference sign is omitted) arranged so as to be adjacent to each other in the Y direction. These respective magnet elements are magnetized in the Z direction and are arranged such that the directions of the magnetic poles of the respective magnet elements are opposite to each other.

Each of first OIS coil 352b and second OIS coil 353b is a so-called air-core coil having an oval shape, to which power is supplied during shake correction. First OIS coil 352b and second OIS coil 353b are fixed, in a state in which the major axes coincide with the X direction, to coil mount parts 32i and 32j of second base 32, respectively. In this state, first OIS coil 352b and second OIS coil 353b overlap first OIS magnet 352a and second OIS magnet 353a, respectively, with prescribed distance gaps therebetween in the Z direction.

As described above, at least part of first OIS actuator 352 (first OIS magnet 352a and first OIS coil 352b) is arranged between first overhang part 34a1 and second overhang part 34a3 of lens guide 341 in the Z direction. On the other hand, at least part of second OIS actuator 353 (second OIS magnet 353a and second OIS coil 353b) is arranged between first overhang part 34a2 and second overhang part 34a4 of lens guide 341 in the Z direction. Such a configuration is effective in reducing the height of lens module 3 and further the height of camera module 1.

First Y-position detecting magnet 352c is held by fourth magnet holding part 34b5 of lens guide 341. Further, second Y-position detecting magnet 353c is held by fourth magnet holding part 34b6 of lens guide 341. First Y-position detecting magnet 352c and second Y-position detecting magnet 353c correspond to examples of the position detecting magnet.

As already described, first Y-position detecting magnet 352c is fixed to lens guide 341 via the second fixed part of fixing plate 36A. Further, second Y-position detecting magnet 353c is fixed to lens guide 341 via the second fixed part of fixing plate 36B.

As illustrated in FIG. 12, OIS Hall element 353d is fixed to Hall element fixed part 34d8 (see FIG. 16) of FPC 344. OIS Hall element 353d detects magnetic flux (also referred to as positional information) of second Y-position detecting magnet 353c, and transmits a detected value to control section 5 (see FIG. 18) mounted on sensor board 6. Control section 5 determines the position of second Y-position detecting magnet 353c (that is, lens guide 341) in the Y direction based on a detected value received from OIS Hall element 353d.

In the case of rear-side OIS actuator 351 having the configuration as described above, when current flows through first OIS coil 352b and second OIS coil 353b via FPC 344 under the control by control section 5, a Lorentz force that displaces first OIS magnet 352a and second OIS magnet 353a in the Y direction is generated. Since each of first OIS magnet 352a and second OIS magnet 353a is fixed to lens guide 341, lens guide 341 is displaced in the Y direction based on the Lorentz force described above. Note that, the direction of displacement of lens guide 341 changes by controlling the direction of current flowing through first OIS coil 352b and second OIS coil 353b.

Note that, in the case of the present embodiment, shield plate 7A made of a magnetic metal is provided between first OIS magnet 352a and first AF magnet 346a in the Z direction (see FIGS. 16, 17 and 25A to 25C) and shield plate 7B made of a magnetic metal is provided between second OIS magnet 353a and second AF magnet 347a in the Z direction (see FIGS. 16, 17 and 25A to 25C) to prevent crosstalk between rear-side OIS actuator 351 and AF actuator 345.

<Shield Plate>

Shield plates 7A and 7B will be described with reference to FIGS. 16, 17 and 25A to 25C. Shield plate 7A includes body 71, first locking part 72, and second locking part 73. Shield plates 7A and 7B are each entirely made of a magnetic metal. Each of shield plates 7A and 7B corresponds to an example of the magnet fixing part.

Body 71 has a plate shape parallel to the XY plane. Body 71 includes first fixing surface 74 on the upper surface (a surface on the + side in the Z direction). Body 71 includes second fixing surface 75 on the lower surface (a surface on the − side in the Z direction).

First locking part 72 is provided in a first end part (an end part on the + side in the X direction) of body 71. First locking part 72 protrudes toward the + side in the X direction from the first end part of body 71. Second locking part 73 is provided in a second end part (an end part on the − side in the X direction) of body 71. Second locking part 73 protrudes toward the − side in the X direction from the second end part of body 71.

Shield plate 7A as described above is arranged above (on the + side in the Z direction) first AF magnet 346a arranged in first magnet holding part 34a5.

In a state in which shield plate 7A is arranged with respect to lens guide 341 as described above, first fixing surface 74 of body 71 is bonded to lens guide 341 with an adhesive. Specifically, first fixing surface 74 is bonded to a portion of lens guide 341, where the portion is provided above first magnet holding part 34a5, with an adhesive. With such bonding, shield plate 7A is fixed to lens guide 341.

Further, first locking part 72 and second locking part 73 engage with lens guide 341 in the Z direction. With such an engagement, movement of shield plate 7A onto the − side in the Z direction with respect to lens guide 341 is regulated. First locking part 72 and second locking part 73 correspond to examples of the locking part locked to lens guide 341.

Second fixing surface 75 of body 71 is bonded to the upper surface of first AF magnet 346a with an adhesive. Second fixing surface 75 as such corresponds to an example of the attachment surface. In this manner, shield plate 7A fixes first X-position detecting magnet 346d to lens guide 341.

In the same manner as shield plate 7A, shield plate 7B includes body 71, first locking part 72, and second locking part 73. Since the structure of shield plate 7B as such is the same as the structure of shield plate 7A, a description of the structure of shield plate 7B will be omitted.

Shield plate 7B is arranged above (on the + side in the Z direction) second AF magnet 347a arranged in first magnet holding part 34a6. In a state in which shield plate 7B is arranged with respect to lens guide 341 as described above, shield plate 7B fixes second AF magnet 347a to lens guide 341 in the same aspect as that of shield plate 7A.

Note that, the adhesive used to bond first AF magnet 346a to shield plate 7A and to bond second AF magnet 347a to shield plate 7B is the same as the adhesive used to bond first X-position detecting magnet 346d and first Y-position detecting magnet 352c to fixing plate 36A and to bond second X-position detecting magnet 347d and second Y-position detecting magnet 353c to fixing plate 36B. That is, the adhesive used to bond the magnets of the driving section, which displaces the movable-side member, to the movable-side member is the same as the adhesive used to bond the magnets, which are used to detect a position of the movable-side member, to the movable-side member (specifically, the magnet fixing part).

<Imaging Element Module>

Imaging element module 4 is arranged on the + side in the X direction with respect to lens part 33. Imaging element module 4 includes, for example, an imaging element such as a charge-coupled device (CCD) image sensor and a complementary metal oxide semiconductor (CMOS) image sensor. The imaging element of imaging element module 4 captures a subject image formed by lens part 33 and outputs an electrical signal corresponding to the subject image. Sensor board 6 is electrically connected to imaging element module 4, power is supplied to imaging element module 4, and an electrical signal of a subject image captured by imaging element module 4 is output via sensor board 6. As imaging element module 4 as such, a conventionally known structure can be used.

<Operations of Second Shake Correction Apparatus and AF Apparatus>

Hereinafter, operations of second shake correction apparatus 35 and AF apparatus 34 of the present embodiment will be described with reference to FIGS. 18 and 26B. Note that, a description of operation of first shake correction apparatus 24 will be omitted.

In a case where shake correction is performed in second shake correction apparatus 35, power is supplied to first OIS coil 352b and second OIS coil 353b. Specifically, in second shake correction apparatus 35, the current values of first OIS coil 352b and second OIS coil 353b are controlled based on a detection signal from a shake detection part (illustration is omitted; for example, a gyro sensor) so as to compensate for shake of camera module 1 in the Y direction. Such control is performed, for example, by control section 5. At this time, displacement of lens guide 341 can be accurately controlled by giving feedback on a detected value of OIS Hall element 353d to control section 5.

When power is supplied to first OIS coil 352b and second OIS coil 353b, a Lorentz force is generated at first OIS coil 352b and second OIS coil 353b by interaction between current flowing through first OIS coil 352b and a magnetic field of first OIS magnet 352a and interaction between current flowing through second OIS coil 353b and a magnetic field of second OIS magnet 353a (Fleming's left hand rule).

In the case of the present embodiment, the direction of a Lorentz force is a direction (also referred to as specific direction) that is either one direction or the other direction in the Y direction. Since first OIS coil 352b and second OIS coil 353b are fixed to second base 32, a reaction force works on first OIS magnet 352a and second OIS magnet 353a. The reaction force serves as a driving force of an OIS voice coil motor and lens guide 341 holding first OIS magnet 352a and second OIS magnet 353a is displaced in the Y direction within the XY plane, thereby shake correction is performed.

Figure 26A:
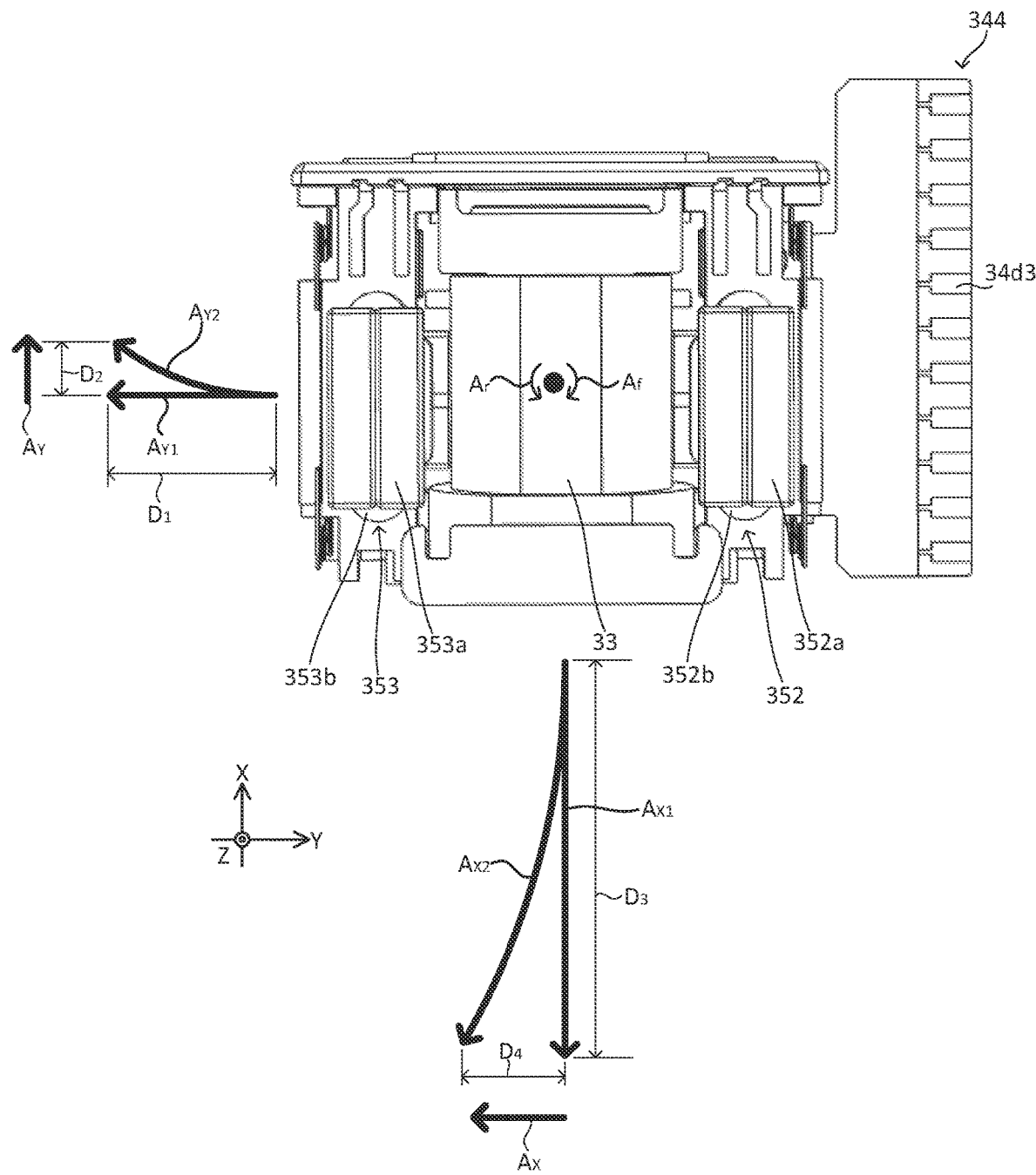
FIG. 26A is a plan view of the lens module from which some members are omitted.

In the shake correction as described above, lens guide 341 is preferably displaced in parallel to the Y direction as in arrow $A_{Y1}$ in FIG. 26A, for example. However, an external force (for example, a moment in the direction of arrow $A_f$ in FIG. 26A) such as to cause displacement of lens guide 341 to deviate from the Y direction may act on lens guide 341 during shake correction. In a case where such an external force acts, lens guide 341 is displaced in a direction deviating from the Y direction as in arrow $A_{Y2}$ in FIG. 26A when thrust acting on lens guide 341 is only thrust parallel to the Y direction generated by second shake correction apparatus 35 (first thrust). Note that, the external force described above may be generated, for example, due to a deviation between the center position of dispersed arrangement (the intersection of straight lines $L_1$ and $L_2$ in FIG. 15) in springs 3421 to 3424 forming first support mechanism 342 described above and center of gravity G of the movable-side member described above. Alternatively, the external force described above may be generated, for example, due to individual differences between springs 3421 to 3424 forming first support mechanism 342. Such an external force is not only the moment described above, but also, for example, a force directed in the X direction. Alternatively, the external force may also include a moment and a force directed in the X direction.

In the case of the present embodiment, on the other hand, AF actuator 345 is driven under the control by control section 5 during shake correction to generate a resistance force (second thrust) that resists the external force described above. Specifically, during shake correction, AF actuator 345 detects the position of first AF magnet 346a by first AF controller 346c (that is, first detection part 346e), and detects the position of second AF magnet 347a by second AF controller 347c (that is, second detection part 347e).

Further, first AF controller 346c (that is, first driving control section 346f) controls the current value (hereinafter, referred to as first current value) of first AF coil 346b based on a control signal (for example, a direction of displacement and an amount of displacement for shake correction) received from control section 5 and a detected value by first detection part 346e. Together therewith, second AF controller 347c (that is, second driving control section 347f) controls the current value (hereinafter, referred to as second current value) of second AF coil 347b based on a detected value by second detection part 347e. Thus, AF actuator 345 generates the resistance force described above (for example, a moment) based on thrust by first AF actuator 346 and thrust by second AF actuator 347.

Note that, the first current value and the second current value are selected from spare data stored in first driving control section 346f and second driving control section 347f by calibration performed in advance, for example. The spare data includes, for example, shake correction parameters composed of the direction of displacement (for example, the direction of arrow $A_{Y1}$ in FIG. 26A), amount of displacement $D_1$ (see FIG. 26A), the direction of deviation of lens guide 341 from the Y direction (for example, the direction of arrow $A_Y$ in FIG. 26A), and amount of deviation $D_2$ of lens guide 341 from the Y direction (see FIG. 26A) in a case where lens guide 341 is displaced in the Y direction by second shake correction apparatus 35, and the first current value and the second current value which are stored in association with the correction parameters and which set amount of deviation $D_2$ described above to zero. In the calibration described above, the first current value and the second current value corresponding to the shake correction parameters are determined in an overall stroke range of lens guide 341 in the Y direction.

The resistance force generated by AF actuator 345 against the external force described above is, for example, a rotational moment in the direction of arrow $A_r$ in FIG. 26A. Further, AF actuator 345 causes a generated resistance force to act on lens guide 341. As a result, lens guide 341 on which a resultant force of thrust parallel to the Y direction (also referred to as specific direction) generated by second shake correction apparatus 35 and a resistance force generated by AF actuator 345 acts is displaceable in parallel to the Y direction as in arrow $A_{Y1}$ in FIG. 26A in a state where the external force described above acts.

Further, in a case where autofocusing is performed in AF apparatus 34, power is supplied to first AF coil 346b and second AF coil 347b. In the case of the present embodiment, the current value in first AF coil 346b is controlled by first AF controller 346c. Further, the current value in second AF coil 347b is controlled by second AF controller 347c.

Specifically, first AF controller 346c controls the current value (first current value) of first AF coil 346b based on a control signal received from control section 5 via first data signal line L5 and a detected value by first detection part 346e of first AF controller 346c.

Further, second AF controller 347c controls the current value (second current value) of second AF coil 347b based on a control signal received from control section 5 via second data signal line L6 and a detected value by second detection part 347e of second AF controller 347c.

When power is supplied to first AF coil 346b and second AF coil 347b, a Lorentz force is generated at first AF coil 346b and second AF coil 347b by interaction between current flowing through first AF coil 346b and a magnetic field of first AF magnet 346a and interaction between current flowing through second AF coil 347b and a magnetic field of second AF magnet 347a.

In a case where the direction and magnitude of a Lorentz force generated from first AF coil 346b and those of a Lorentz force generated from second AF coil 347b are equal, the direction of a resultant force of these respective Lorentz forces is either one direction or the other direction in the X direction. Since first AF magnet 346a and second AF magnet 347a are fixed to second base 32, a reaction force works on first AF coil 346b and second AF coil 347b. The reaction force serves as a driving force of an AF voice coil motor and lens guide 341 holding first AF coil 346b and second AF coil 347b is moved in the X direction (the direction of the second optical axis), thereby autofocusing is performed.

In the autofocusing as described above, lens guide 341 is preferably displaced in parallel to the X direction as in arrow $A_{X1}$ of FIG. 26A, for example. However, an external force (for example, a moment in the direction of arrow $A_r$ in FIG. 26A) such as to cause displacement of lens guide 341 to deviate from the X direction may act on lens guide 341 during autofocusing. In a case where such an external force acts on lens guide 341, lens guide 341 is displaced in a direction deviating from the X direction as in arrow $A_{X2}$ in FIG. 26A when thrust acting on lens guide 341 is only thrust parallel to the X direction (first thrust). Such an external force is not only the moment described above, but also, for example, a force directed in the Y direction. Alternatively, the external force may also include a moment and a force directed in the Y direction.

In the case of the present embodiment, on the other hand, thrust including thrust parallel to the X direction (first thrust) and a resistance force (second thrust) that resists the external force is generated by causing thrust generated by first AF actuator 346 to differ from thrust generated by second AF actuator 347 during autofocusing. Specifically, during autofocusing, AF actuator 345 detects the position of first AF magnet 346a by first AF controller 346c (that is, first detection part 346e), and detects the position of second AF magnet 347a by second AF controller 347c (that is, second detection part 347e).

Further, AF actuator 345 controls the current value of first AF coil 346b by first AF controller 346c (that is, first driving control section 346f), and controls the current value of second AF coil 347b by second AF controller 347c (that is, second driving control section 347f). Thus, thrust generated by first AF actuator 346 and thrust generated by second AF actuator 347 are caused to differ from each other. Based on such a difference in thrust, AF actuator 345 generates thrust including thrust parallel to the X direction (first thrust) and the resistance force (second thrust) described above. Specifically, the thrust parallel to the X direction is a resultant force of thrust generated by first AF actuator 346 and thrust generated by second AF actuator 347. Further, the resistance force (second thrust) described above is a moment (see arrow $A_r$ in FIG. 26A) generated based on a difference between thrust generated by first AF actuator 346 and thrust generated by second AF actuator 347.

Note that, the first current value described above and the second current value described above are selected from spare data stored in first driving control section 346*f* and second driving control section 347*f* by calibration performed in advance, for example. The spare data includes, for example, AF parameters composed of the direction of displacement (for example, the direction of arrow $A_{X1}$ in FIG. 26A), amount of displacement $D_3$ (see FIG. 26A), the direction of deviation of lens guide 341 from the X direction (for example, the direction of arrow $A_X$ in FIG. 26A), and amount of deviation $D_4$ of lens guide 341 from the X direction (see FIG. 26A) in a case where lens guide 341 is displaced in the X direction by AF actuator 345, and the first current value and the second current value which are stored in association with the AF parameters and which set amount of deviation $D_4$ described above to zero. In the calibration described above, the first current value and the second current value corresponding to the AF parameters are determined in an overall stroke range of lens guide 341 in the X direction.

The resistance force generated by AF actuator 345 against the external force described above is, for example, a rotational moment in the direction of arrow $A_r$ in FIG. 26A. Further, AF actuator 345 causes generated thrust (a resultant force of the first thrust and the second thrust) to act on lens guide 341. As a result, lens guide 341 on which such a resultant force acts is displaceable in parallel to the X direction as in arrow $A_{X1}$ in FIG. 26A in a state where the external force acts.

Figure 26B:
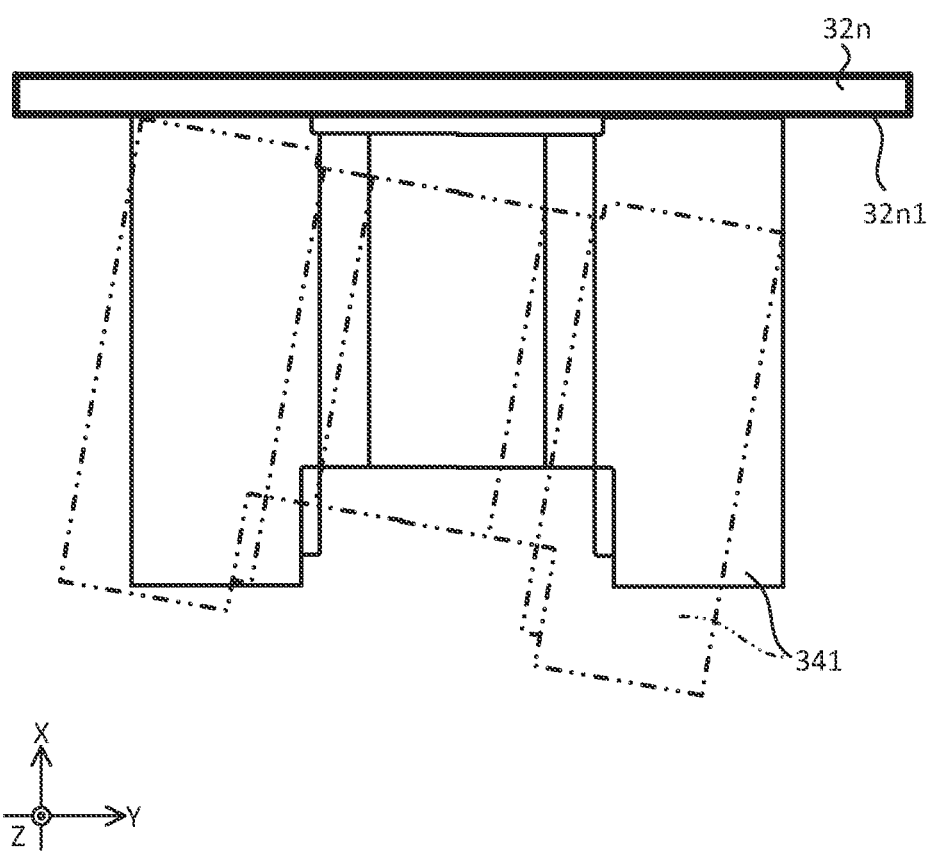
FIG. 26B is a schematic plan view of the lens guide and a reference member.

Note that, as indicated by the long dashed double-short dashed line in FIG. 26B, a force such as to cause lens guide 341 to be inclined with respect to the Y direction and the Z direction (specifically, first reference surface 32*n*1 of reference part 32*n*) may act on lens guide 341 in a state in which lens guide 341 stops. Such a force is generated due to an assembly error, individual differences between springs 3421 to 3424 forming first support mechanism 342 or the like. When such an inclination is present, lens guide 341 is displaced while the inclination is maintained during autofocusing.

Accordingly, in the case of the present embodiment, as indicated by the solid line in FIG. 26B, the calibration described above is performed by using a state, in which an end surface on the + side in the X direction of lens guide 341 is caused to abut on first reference surface 32*n*1 of reference part 32*n* (that is, the reference state of lens guide 341), as a reference. Thus, during the autofocusing described above, lens guide 341 can be displaced in the X direction while a state in which lens guide 341 is not inclined with respect to first reference surface 32*n*1 of reference part 32*n* (that is, the state of lens guide 341 indicated by the solid line in FIG. 26B) is maintained. Further, according to the configuration described above, there is a possibility that work of active alignment between prism module 2 and lens module 3 can be omitted or simplified in the assembly process of camera module 1.

Operation and Effect of Present Embodiment

In the case of camera module 1 according to the present embodiment, first X-position detecting magnet 346*d*, second X-position detecting magnet 347*d*, first Y-position detecting magnet 352*c*, and second Y-position detecting magnet 353*c* are fixed to lens guide 341 made of a synthetic resin via fixing plates 36A and 36B each made of a metal. The bonding strength in a case where each of magnets 346*d*, 347*d*, 352*c*, and 353*c* as such is bonded to fixing plates 36A and 36B each made of a metal is higher than the bonding strength in a case where each of magnets 346*d*, 347*d*, 352*c*, and 353*c* described above is bonded to lens guide 341 made of a synthetic resin.

Further, with the engagement with and the bonding to lens guide 341, fixing plates 36A and 36B are fixed to lens guide 341 in a state in which movement of fixing plates 36A and 36B onto the − side in the Z direction is regulated. Such a configuration is effective in preventing fixing plates 36A and 36B from falling off from lens guide 341, and further in preventing each of magnets 346*d*, 347*d*, 352*c*, and 353*c* from falling off from lens guide 341.

Additional Remark

Although the invention made by the present inventor has been specifically described thus far based on some embodiments, the present invention is not limited to the above-described embodiments and can be modified without departing from the gist thereof.

In each embodiment described above, the camera module includes the first support mechanism that elastically supports the movable-side member with respect to the fixed-side member.

In a case where the present invention is implemented, however, a second support mechanism that supports lens guide 341 on second base 32 in a state in which lens guide 341 is displaceable with respect to second base 32 within the XY plane may be provided in addition to the first support mechanism. Such a second support mechanism may support lens guide 341 in a state in which displacement of lens guide 341 with respect to second base 32 in the Z direction is regulated.

Further, for example, although a smartphone, which is a camera-equipped mobile terminal, has been described as an example of the camera mount device including camera module 1 in each embodiment described above, the present invention is applicable to a camera mount device including a camera module and an image processing part that processes image information obtained by the camera module. The camera mount device includes an information apparatus and a transport apparatus. The information apparatus includes, for example, a camera-equipped mobile phone, a notebook computer, a tablet terminal, a portable game machine, a web camera, and a camera-equipped in-vehicle apparatus (such as a rear-view monitor apparatus and a drive recorder apparatus). Further, the transport apparatus includes, for example, an automobile.

Figure 28A:
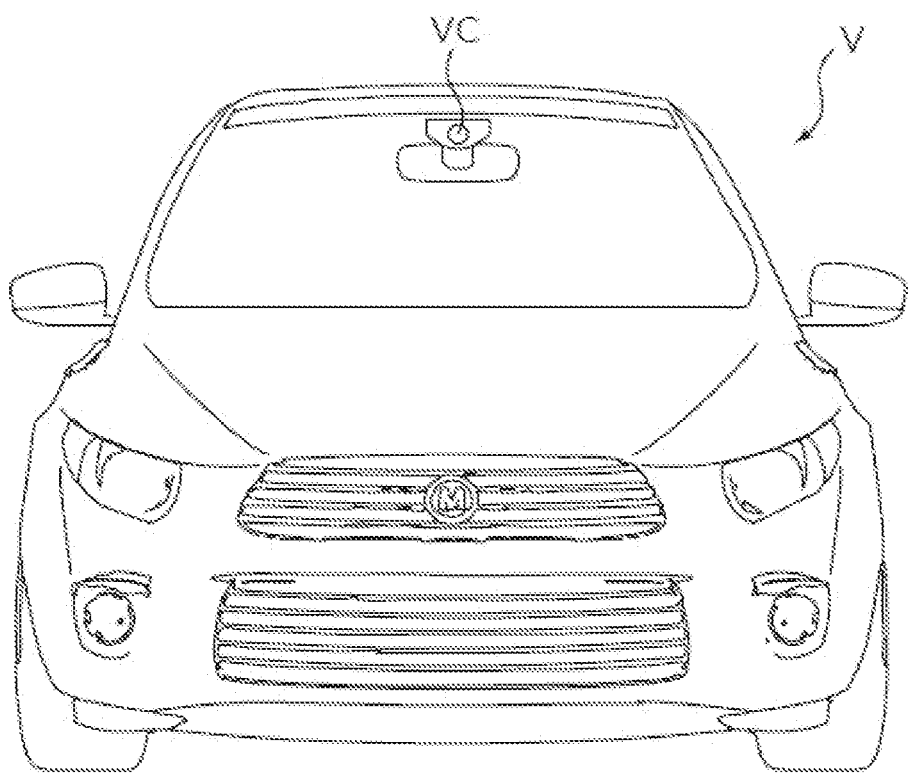
FIGS. 28A and 28B illustrate an automobile as a camera mount device on which an in-vehicle camera module is mounted.
Figure 28B:
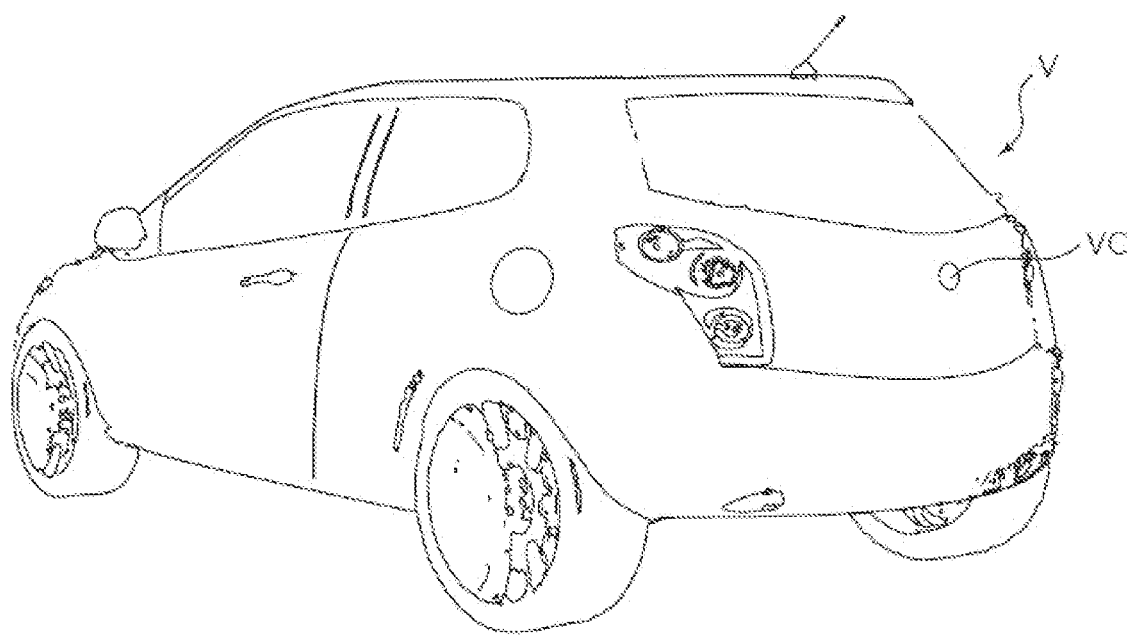

FIGS. 28A and 28B illustrate automobile V as a camera mount device on which in-vehicle camera module VC (Vehicle Camera) is mounted. FIG. 28A is a front view of automobile V, and FIG. 28B is a rear perspective view of automobile V. In automobile V, camera module 1 described in the embodiments is mounted as in-vehicle camera module VC. As illustrated in FIGS. 28A and 28B, in-vehicle camera module VC is attached to the windshield to face the front side or is attached to the rear gate to face the rear side, for example. This in-vehicle camera module VC is used for a rear-view monitor, a drive recorder, collision-prevention control, automatic operation control, or the like.

Further, the configurations of the AF voice coil motor and the OIS voice coil motor in the present invention are not limited to those indicated in each embodiment described above.

Further, as a support mechanism supporting the movable-side member on the fixed-side member, an elastic support member composed of elastomer or the like, for example, may also be applied instead of springs 3421 to 3424 of first support mechanism 342 indicated in each embodiment described above.

The present invention is also applicable to a lens driving apparatus that does not have the OIS function and has only the AF function. Further, the present invention is also applicable to a lens driving apparatus that does not have the AF function and has only the OIS function.

Each of the embodiments disclosed herein should be considered exemplary in all respects, and not limiting. The scope of the present invention is indicated not by the above description, but by the claims, and is intended to include meanings equivalent to the scope of the claims and all modifications within the scope.

The disclosure of Japanese Patent Application No. 2018-207502, filed on Nov. 2, 2018, including the specification, drawings and abstract, is incorporated herein by reference in its entirety.

INDUSTRIAL APPLICABILITY

A camera actuator and a camera module according to the present invention can be mounted on a thin camera mount device such as a smartphone, a mobile phone, a digital camera, a notebook computer, a tablet terminal, a portable game machine, and an in-vehicle camera, for example.

REFERENCE SIGNS LIST

1 Camera module
2 Prism module
21 First cover
22 First base
220 Base-side opening
223 First accommodation space
224*a* First side wall part
224*b* Second side wall part
224*c*1, 224*c*2 First weir part
224*d*1, 224*d*2 Second weir part
224*e*1, 224*e*2, 224*f*1, 224*f*2 Spring arrangement space
224*g*1, 224*g*2, 224*g*3, 224*h*1, 224*h*2, 224*h*3 Protrusion
225*c* First receiver part
225*d* Second receiver part
226 First positioning protrusion
227 Second positioning protrusion
229 Bottom wall part
23 Prism
231 Optical path bending surface
24 First shake correction apparatus
241 Holder
241*a* Mounting surface
241*f*, 241*g* Opposing wall part
241*q*, 241*r* Overhang part
243 Swing support spring
243*a*, 243*b* First locking part
243*c* Second locking part
243*d*, 243*e* First through-hole
243*f* Second through-hole
243*g* Twist allowing part
243*h* Spring-side guide surface
243*i* Continuous part
243*j*, 243*k* Continuous part element
243*m* Base end-side continuous part
243*n* Meandering continuous part
244 Front-side OIS actuator
244*a* First magnet
244*c* First coil
244*e* First Hall element
245 Swing guide member
25 FPC
27 Damping member
3 Lens module
31 Second cover
31*a* Top plate part
31*b* Front plate part
31*c* Rear plate part
31*d* First side plate pan
31*e* Second side plate pan
31*f* Notch part
31*g* Front-side opening
31*h* Corner part
31*i* Rear-side opening
32 Second base
32*a* Lower-side base element
32*b* Upper-side base element
32*c* Second accommodation space
32*d* Bottom part
32*e*, 32*f* Bottom through-hole
32*g*, 32*h* Second side wall part
32*a*1, 32*a*2 Second lower wall element
32*b*1, 32*b*2 Second upper wall element
32*i*, 32*j* Coil mount part
321*i*, 322*i*, 321*j*, 322*j* Connection hole
32*k* Reinforcing plate
32*m*1, 32*m*2, 32*m*3, 32*m*4 Spring arrangement part
32*n* Reference part
32*n*1 First reference surface
33 Lens part
34 AF apparatus
341 Lens guide
341*a* Lens holding part
34*a*1, 34*a*2 First overhang pan
34*a*3, 34*a*4 Second overhang pan
34*a*5, 34*a*6 First magnet holding pan
34*a*7, 34*a*8 Second magnet holding pan
34*b*1, 34*b*2 Space
34*b*3, 34*b*4 Third magnet holding part
34*b*5, 34*b*6 Fourth magnet holding part
342 First support mechanism
3421, 3422, 3423, 3424 Spring
342*b* First fixed part
342*c* Second fixed part
342*d* Connection part
342*e* First bending part
342*f* Second bending part
344 FPC
344*a* FPC base
34*d*1 First terminal part
34*d*2 Second terminal part
34*d*3 Third terminal part
34*d*4 First coil fixed part
34*d*5 Second coil fixed part
34*d*6 First controller fixed part
34*d*7 Second controller fixed part
34*d*8 Hall element fixed part
344*b* AF driving control circuit
L1 First power supply line
L2 Second power supply line
L3 First grounding line
L4 Second grounding line
L5 First data signal line
L6 Second data signal line
L7 First clock line
L8 Second clock line L9, L10 First coil power supply line
L11, L12 Second coil power supply line
T1 Power supply terminal
T2 Grounding terminal
T3 Data signal terminal
T4 First clock terminal
T5 Second clock terminal
345 AF actuator
346 First AF actuator
346a First AF magnet
346b First AF coil
346c First AF controller
346d First X-position detecting magnet
346e First detection part
346f First driving control section
347 Second AF actuator
347a Second AF magnet
347b Second AF coil
347c Second AF controller
347d Second X-position delecting magnet
347e Second detection part
347f Second driving control section
35 Second shake correction apparatus
351 Rear-side OIS actuator
352 First OIS actuator
352a First OIS magnet
352b First OIS coil
352c First Y-position detecting magnet
353 Second OIS actuator
353a Second OIS magnet
353b Second OIS coil
353c Second Y-position detecting magnet
353d OIS Hall element
36A, 36B Fixing plate
361 First fixed part
362 Second fixed part
363 Connection part
363a, 363b Positioning protrusion
364 First fixing surface
365 Second fixing surface
366a First locking part
366b Second locking part
367 Third fixing surface
368 Fourth fixing surface
369a Third locking part
369b Fourth locking pan
4 Imaging element module
5 Control section
6 Sensor board
6a Board-side circuit
7A, 7B Shield plate
71 Body
72 First locking part
73 Second locking part
74 First fixing surface
75 Second fixing surface
76 Outer side surface
V Automobile
VC In-vehicle camera module

What is claimed is:

1. A camera actuator, comprising:
a fixed-side member;
a movable-side member provided so as to be displaceable with respect to the fixed-side member and holding a lens part; and
a driving section that displaces the movable-side member in at least one direction of a first direction and a second direction orthogonal to the first direction, wherein:
the driving section includes a driving magnet and a position detecting magnet which is used to detect the position of the movable-side member in the one direction;
the movable-side member includes a first magnet fixing part and a second magnet fixing part that fixe the driving magnet and the position detecting magnet such that the driving magnet part and the position detecting magnet each faces the fixed-side member;
the first magnet fixing part and the second magnet fixing part are made of different metal members;
the first magnet fixing part is configured of a shield plate made of a magnetic metal; and
the second magnet fixing part is configured of a fixing plate made of a non-magnetic metal.

2. The camera actuator according to claim 1, wherein:
the first magnet fixing part and the second magnet fixing part fixe the driving magnet and the position detecting magnet such that the driving magnet and the position detecting magnet are separated from the fixed-side member in an up-down direction orthogonal to a plane including the first direction and the second direction and a lower surface of the driving magnet and the position detecting magnet faces the fixed-side member, and
the first magnet fixing part and the second magnet fixing part respectively face upper surfaces of the driving magnet and the position detecting magnet.

3. The camera actuator according to claim 1, wherein:
the movable-side member includes a body made of a resin, and
the first magnet fixing part and the second magnet fixing part are fixed to the body.

4. The camera actuator according to claim 3, wherein the first magnet fixing part and the second magnet fixing part each has a plate shape.

5. The camera actuator according to claim 4, wherein the first magnet fixing part and the second magnet fixing part each includes a locking part locked to the body.

6. The camera actuator according to claim 5, wherein the first magnet fixing part and the second magnet fixing part is each bonded to the body.

7. A camera module, comprising:
the camera actuator according to claim 1; and
an imaging element arranged at a stage subsequent to the lens part.

8. A camera mount device, comprising:
the camera module according to claim 7; and
a control section that controls the camera module.

9. A camera actuator, comprising:
a fixed-side member;
a movable-side member provided so as to be displaceable with respect to the fixed-side member and holding a lens part; and
a driving section that displaces the movable-side member within a plane including a first direction and a second direction orthogonal to the first direction, wherein:
the movable-side member includes a magnet fixing part that fixes a magnet part such that the magnet part faces the fixed-side member, the magnet part being used to detect a position of the movable-side member in one of the first direction and the second direction, and the magnet fixing part includes an attachment surface made of a metal, the attachment surface being a surface to which the magnet part is attached, and wherein:

the movable-side member includes a body made of a resin, and the magnet fixing part is fixed to the body.

10. The camera actuator according to claim 9, wherein:

the magnet fixing part fixes the magnet part such that the magnet part is separated from the fixed-side member in an up-down direction orthogonal to the plane and a lower surface of the magnet part faces the fixed-side member, and the attachment surface faces an upper surface of the magnet part.

11. The camera actuator according to claim 9, wherein the attachment surface is made of a non-magnetic metal.

12. The camera actuator according to claim 9, wherein the magnet fixing part has a plate shape.

13. The camera actuator according to claim 12, wherein the magnet fixing part includes a locking part locked to the body.

14. The camera actuator according to claim 13, wherein the magnet fixing part is bonded to the body.

15. A camera module, comprising:

the camera actuator according to claim 9; and an imaging element arranged at a stage subsequent to the lens part.

16. A camera mount device, comprising:

the camera module according to claim 15; and a control section that controls the camera module.

* * * * *